US007207597B2

(12) United States Patent
Iwai et al.

(10) Patent No.: US 7,207,597 B2
(45) Date of Patent: Apr. 24, 2007

(54) GAS GENERATOR FOR AIR BAG AND AIR BAG APPARATUS

(75) Inventors: Yasunori Iwai, Osaka (JP); Nobuyuki Katsuda, Hyogo (JP); Yoshihiro Nakshima, Hyogo (JP); Nobuyuki Ohji, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 11/313,936

(22) Filed: Dec. 22, 2005

(65) Prior Publication Data

US 2006/0131853 A1 Jun. 22, 2006

Related U.S. Application Data

(62) Division of application No. 09/869,954, filed as application No. PCT/JP00/06911 on Oct. 4, 2000, now abandoned.

(30) Foreign Application Priority Data

| Oct. 4, 1999 | (JP) | ................................ 11-283422 |
| Oct. 4, 1999 | (JP) | ................................ 11-283423 |
| Oct. 14, 1999 | (JP) | ................................ 11-291982 |
| Aug. 22, 2000 | (JP) | ................................ 2000-288083 |
| Sep. 22, 2000 | (JP) | ................................ 2000-289201 |

(51) Int. Cl.
B60R 21/26 (2006.01)

(52) U.S. Cl. ...................... 280/742; 280/741; 280/737; 102/531

(58) Field of Classification Search ................ 280/736, 280/737, 741, 742; 102/530, 531
See application file for complete search history.

(56) References Cited

U.S. PATENT DOCUMENTS

| 4,380,346 A | * | 4/1983 | Davis et al. ................ 280/736 |
| 4,950,458 A | | 8/1990 | Cunningham |
| 4,998,751 A | | 3/1991 | Paxton et al. |
| 5,471,932 A | * | 12/1995 | Kraft et al. ................. 102/531 |

(Continued)

FOREIGN PATENT DOCUMENTS

DE 195 22 847 C1 2/1997

(Continued)

*Primary Examiner*—Ruth Ilan
(74) *Attorney, Agent, or Firm*—Birch, Stewart, Kolasch & Birch, LLP

(57) ABSTRACT

When a gas generating agent 9a inside a first combustion chamber 5a is burnt, a gas generating agent 9b is prevented from being burnt by function of a metal thin plate 11 closing a communication hole 10 with a second combustion chamber 5b. A cup 1190 having a hole 1191 is covered on an igniter 1112, and the flame thereof advances into a transfer charge 1116 straightly in a narrow width. Accordingly, since the transfer charge 1116 is burnt completely, sufficient flame for burning a gas generating agent 1109 can be generated securely. A communication hole 3010 between a first combustion chamber 3005a and a second combustion chamber 3005b is closed by double-layered seal tape 3011 laminated through an adhesive layer. After activation, the seal tapes 3011 are not ruptured due to increase in the internal pressure of the first combustion chamber 3005a, but they are peeled off easily due to increase in the internal pressure of the second combustion chamber 3005b.

7 Claims, 15 Drawing Sheets

U.S. PATENT DOCUMENTS

| | | | |
|---|---|---|---|
| 5,536,340 A | 7/1996 | Ramaswamy | |
| 5,564,738 A * | 10/1996 | Johnson | 280/736 |
| 5,564,743 A * | 10/1996 | Marchant | 280/741 |
| 5,756,928 A | 5/1998 | Ito et al. | |
| 5,765,866 A | 6/1998 | Canterberry et al. | |
| 5,936,195 A | 8/1999 | Wheatley | |
| 6,170,869 B1 * | 1/2001 | Tomiyama | 280/741 |

FOREIGN PATENT DOCUMENTS

| | | |
|---|---|---|
| DE | 298 09 062 U1 | 10/1998 |
| EP | 0 733 519 A2 | 9/1996 |
| EP | 0 773 145 A2 | 5/1997 |
| EP | 0 778 181 A2 | 6/1997 |
| EP | 0 783 997 A | 7/1997 |
| EP | 0 787 630 A1 | 8/1997 |
| EP | 0 926 015 A2 | 6/1999 |
| EP | 1 024 062 A1 | 8/2000 |
| GB | 2 281 608 A | 3/1995 |
| JP | 5-319199 | 3/1993 |
| JP | 05-310096 | 11/1993 |
| JP | 8-501765 | 2/1996 |
| JP | 3-029326 | 7/1996 |
| JP | 3-040049 | 5/1997 |
| JP | 9-183359 A | 7/1997 |
| JP | 11-240412 A | 9/1999 |

* cited by examiner

GAS GENERATOR FOR AIR BAG AND AIR BAG APPARATUS

This application is a Divisional of application Ser. No. 09/869,954 filed on Jul. 9, 2001 now abandoned. Application Ser. No. 09/869,954 is the national phase under 35 U.S.C. § 371 of PCT International Application No. PCT/JP00/06911 which has an International filing date of Oct. 4, 2000, which designated the United States of America, and for which priority is claimed under 35 U.S.C. § 120. This application claims priority of Application No. 11-283422; 11-283423; 11-291982; 2000-288083 and 2000-289201 filed in JAPAN on Oct. 4, 1999; Oct. 4, 1999; Oct. 14, 1999; Sep. 22, 2000 and Sep. 22, 2000, respectively, under 35 U.S.C. § 119. The entire contents of all of the above-mentioned domestic and foreign applications are hereby incorporated by reference.

TECHNICAL FIELD OF THE INVENTION

The present invention relates to a gas generator for an air bag and an air bag apparatus.

PRIOR ART

An air bag system which is mounted on various kinds of vehicles and the like including automobiles, aims to hold a passenger by means of an air bag (a bag body) rapidly inflated by gas when the vehicle collides at a high-speed so as to prevent the passenger from crashing into a hard portion inside the vehicle such as a steering wheel, a windshield due to an inertia and getting injured. Generally, this kind of air bag system comprises a gas generator to be actuated by a collision of the vehicle and discharge gas, and an air bag to introduce the gas therein to inflate.

It is demanded that such an airbag system can safely restrain the passenger even when frame of the occupant (for example, whether a sitting height is long or short, whether an adult or a child, and the like), a sitting attitude (for example, an attitude of holding on the steering wheel) and the like are different. Then, there has been conventionally suggested an airbag system which actuates, applying the impact to the passenger as small as possible at the initial stage of the actuation. Gas generators in such a system are disclosed in JP-A 8-207696, U.S. Pat. Nos. 4,998,751 and 4,950,458. JP-A 8-207696 suggests a gas generator in which one igniter ignites two kinds of gas generating agent capsules so as to generate the gas at two stages. U.S. Pat. Nos. 4,998,751 and 4,950,458 suggest a gas generator in which two combustion chambers are provided for controlling actuation of the gas generator so as to generate the gas at two stages due to a expanded flame of the gas generating agent.

The above gas generator provided with two combustion chambers has an advantage in that gas can be generated at two stages. In this case, it is important that the igniting and burning of the gas generating agent in one combustion chamber is prevented from igniting and combusting the gas generating agent in the other combustion chamber, in order to prevent malfunction and to improve the safety and reliability of the product.

An ignition means for igniting and burning a gas generating means contained in the gas generator generally includes an igniter and a transfer charge which is to be burnt by a flame generated by actuation of the igniter, but the transfer charge cannot be burnt sufficiently in some arrangement of the igniter and the transfer charge so that the gas generating means cannot be burnt completely. That is, in such a case that the flame generated by actuation of the igniter is emitted radially towards the transfer charge, there occurs a problem such that the transfer charge is pushed to the depth of the transfer charge accommodating chamber by the pressing force of the flame so that the portion of the transfer charge which has been pushed into the depth is not burnt completely.

As a gas generating mechanism in such a gas generator, such a structure is generally employed that a transfer charge is burnt by an electric ignition type igniter and the gas generating agent is burnt by the flame thus generated. At this time, since a space in which the transfer charge is stored and a combustion chamber in which the gas generating agent is stored can communicate with each other through a hole closed by a seal tape before activation, it is required that the flame generated by combustion of the transfer charge breaks or ruptures the seal tape to flow into the combustion chamber. However, in this case, when the breaking of the seal tape is not made smoothly, the combustion of the gas generating agent is also affected adversely. Also, since the stored state of the transfer charge is varies according to the shape of the gas generator, measure is required according to the shape difference.

DISCLOSURE OF THE INVENTION

In order to solve the above problems, a first object of the present invention is to secure safety and reliability of a gas generator with two combustion chambers, and to provide a gas generator for an air bag which can show stably and effectively the feature such that a gas can be generated at two stages and an air bag apparatus using the gas generator.

As one solving means, the present invention provides a gas generator for an air bag, comprising, in a housing having a gas discharge port, an ignition means to be actuated by the impact and a gas generating means which is to be ignited and burnt by the ignition means for generating a combustion gas to inflate an air bag, wherein two combustion chambers for accommodating the gas generating means are provided in the housing, and further a communication hole to allow mutual communication between the respective combustion chambers is provided, and the communication hole is closed by a metal thin plate having a tensile strength of 15 kg/mm$^2$ or more and a thickness of 10 to 200 μm.

Also, according to the above gas generator, the present invention provides a gas generator wherein the two combustion chambers accommodating the gas generating means are provided concentrically to be adjacent to each other in the radial direction of the housing, and the communication hole which allows mutual communication between the respective combustion chambers is further provided.

Further, according to the present invention, the above gas generator for an air bag can be a gas generator in which the two combustion chambers accommodating the gas generating means are provided concentrically to be adjacent to each other in the radial direction of the housing, a communication hole which allows mutual communication between the respective combustion chambers is further provided, the combustion chamber which exists more inside than the other is provided in the upper space side of an inner-cylindrical member disposed in the housing, the ignition means is provided in the lower space side of the inner-cylindrical member, and the upper space and the lower space are defined by a partition wall.

As another solving means, the present invention provides a gas generator for an air bag in which the ignition means to be actuated by the impact and the gas generating means which is to be ignited and burnt by the ignition means for generating a combustion gas to inflate an air bag are stored in a housing which is formed in a cylindrical shape having the axial length longer than the outermost diameter and provided with a plurality of gas discharge ports in the circumferential wall thereof, comprising two combustion chambers for accommodating gas generating means in the housing, which are provided concentrically to be adjacent to each other in the axial direction of the housing and/or in the radial direction thereof, and a communication hole which allows mutual communication between the respective combustion chambers, which is closed by a metal thin plate having a tensile strength of 15 kg/mm$^2$ or more and a thickness of 10 to 200 µm.

Furthermore, in order to solve the above problems, a second object of the present invention is to provide a gas generator for an air bag in which a complete combustion of a transfer charge is secured and consequently, combustion performance of gas generating agent is made more smooth and more secure so that performance and reliability which are required as a product can be improved, and also to provide an air bag apparatus using the gas generator.

The present invention provides a gas generator for an air bag, comprising, in the housing with a gas discharge port, the ignition means including an igniter to be actuated by the impact and a transfer charge, and the gas generating means which is to be ignited and burnt by the ignition means for generating a combustion gas to inflate an air bag, wherein, in the ignition means, a flame discharge portion of the igniter and the transfer charge face each other at least partially, and the area ratio (A/B) of the area (A) of the flame discharge portion to the area (B) of the transfer charge is 0.005 to 0.3.

In order to solve the above problems, a third object of the present invention is to provide a gas generator for an air bag in which the combustion of the gas generating agent accompanying the combustion of the transfer charge can be performed smoothly and stably, and an air gag apparatus using the gas generator.

The present invention provides a gas generator for an airbag comprising, in the housing with a gas discharge port, the ignition means to be actuated by the impact and the gas generating means which is to be ignited and burnt by the ignition means for generating a combustion gas to inflate an air bag, wherein the ignition means includes the igniter and the transfer charge in an ignition means accommodating chamber, and the charged density of the transfer charge is 0.1 to 5 g/cm$^3$, preferably 0.5 to 1.5 g/cm$^3$.

By setting the charged density of the transfer charge to the predetermined range in this manner, a flame of the igniter in the ignition means accommodating chamber can ignite uniformly the transfer charge in combustion. Consequently, the gas generating agent in the combustion chamber is burnt smoothly and stably, so that reliability of a product is improved.

Also, the present invention provides a gas generator for an air bag comprising, in the housing with a gas discharge port, the ignition means to be actuated by the impact and the gas generating means which is to be ignited and burnt by the ignition means for generating a combustion gas to inflate an air bag, wherein the ignition means includes the igniter and the transfer charge in the ignition means accommodating chamber, the charged density of the transfer charge is 0.1 to 5 g/cm$^3$, preferably 0.5 to 1.5 g/cm$^3$, and a ratio [(A+B)/A] of the volume (A) of a space where the transfer charge occupies in the ignition means accommodating chamber and the volume (B) of the remaining space in the ignition means accommodating chamber is 1.05 to 20, preferably 1.5 to 3.

Next, in a gas generator provided with two combustion chambers, there is a type such that, in order to made the generator lighter in weight and more compact, one combustion chamber in which combustion is performed first is used as a gas-flow path for the gas generated in the other combustion chamber in which combustion is performed later. In a case of the gas generator of this type, the two chambers are caused to communicate with each other through a communication hole, and the communication hole is closed by a metal thin plate. In a gas generator of such a type, it is required that the metal thin film is not broken at the time of the first combustion but it is easily peeled off or broken at the time of the later combustion.

Furthermore, in case of some kinds of the gas generating agent, it is necessary to increase the pressure in the gas generating chamber at the time of the first combustion in order to improve the igniting performance of the gas generating agent. In this case, the metal thin plate has to be made so as to bear the increase of the pressure in the combustion chamber but be peeled off at the time of the later combustion.

Therefore, a fourth object of the present invention is to secure safety and reliability in a gas generator provided with two combustion chambers, and to provide a gas generator for an air bag which can show stably and effectively the feature such that gas can be generated at two stages and an air bag apparatus using the same.

The present invention is applicable as long as it is a gas generator for an air bag in which a communication hole for communicating two combustion chambers with each other is provided, and a structures other than the above is not particularly limited in the present invention.

The present invention provides a gas generator for an air bag comprising, in the housing with a gas discharge port, the ignition means to be actuated by the impact and the gas generating means which is to be ignited and burnt by the ignition means for generating a combustion gas to inflate an air bag, wherein a first combustion chamber and a second combustion chamber, in which the gas generating means are respectively accommodated and the communication hole for allowing mutual communication between two chambers is arranged, are provided in the housing, and the communication hole between the first combustion chamber and the second combustion chamber is closed by a plurality of metal thin plates laminated through an adhesive.

Furthermore, the present invention provides a gas generator for an air bag comprising, in a housing having a gas discharge port, the ignition means to be actuated by the impact and the gas generating means which is to be ignited and burnt by the ignition means for generating a combustion gas to inflate an air bag, wherein the gas generator has at least one requirement selected among the requirements (1), (2), (3) and (4) described below:

(1) Two combustion chambers which accommodate the gas generating means respectively are provided in the housing, and the communication hole which allows mutual communication between the respective combustion chambers is further provided, and the communication hole is closed by a metal thin plate having the tensile strength of 15 kg/mm$^2$ or more and the thickness of 10 to 200 µm;

(2) A gas generator for an air bag comprising the ignition means including the igniter and the transfer charge, and the gas generating means which is to be ignited and burnt by the ignition means for generating a combustion gas to inflate an air bag, wherein, in the ignition means, the flame discharge portion of the igniter and the transfer charge face each other at least partially, and the area ratio (A/B) of the area (A) of the flame discharge port to the area (B) of the transfer charge is 0.005 to 0.3;

(3) The ignition means includes the igniter and the transfer charge in the ignition means accommodating chamber, wherein the charged density of the transfer charge is 0.1 to 5 g/cm$^3$; and (4) A first combustion chamber and a second combustion chamber, which accommodate gas generating means respectively and has a communication hole for allowing mutual communication between the chambers, are provided in the housing, and the communication hole between the first combustion chamber and the second combustion chamber is closed by a plurality of metal thin plates laminated through an adhesive.

That is, the present invention provides the above gas generator satisfying at least one requirement among (1), (2), (3) or (4). The present invention provides a gas generator having a combination of these requirements.

The present invention controls ignition/combustion of the gas generating means according to any one of the requirements (1), (2), (3) or (4).

DETAILED DESCRIPTION OF THE INVENTION

The present invention will be explained below in the order of the requirements (1), (2), (3) and (4).

Gas Generator Satisfying Requirement (1)

As mentioned above, a communication hole which allows mutual communication between respective combustion chambers is closed by a thin metal plate (for example, a seal tape) having a tensile strength of 15 kg/mm$^2$ or more, preferably 25 to 60 kg/mm$^2$ or more, and a thickness of 10 to 200 µm, preferably 20 to 100 µm. Because of this seal tape, it is prevented that, when gas generating means (gas generating means to be ignited and burnt first) stored in one combustion chamber is burnt by ignition of one igniter to generate pressure, the metal thin plate is ruptured or broken by the pressure to burn gas generating means (gas generating means to be secondly ignited and burnt) stored in the other combustion chamber. By setting the thickness of the metal thin plate to 10 µm or more, the above prevention can be realized. By setting the thickness of the metal thin plate to 200 µm or less, it is possible to prevent the seal tape from pealing off easily, due to the force, larger than that of the adhesive layer, by which force the thin metal plate, which is attached to the curved surface corresponding to the shape of a portion where the communication hole(s) is formed, springs back to be flat. As an example of a thin metal plate, a thin plate made of aluminum, stainless steel, or copper can be used.

The gas generating means is for inflating an air bag to restrain a passenger with gas generated due to combustion of the gas generating means. Accordingly, when the ignition means includes a transfer charge which is ignited and burnt to burn the gas generating means, combustion gas generated due to combustion of the transfer charge is for burning the gas generating means but it is not for inflating an air bag directly. Thus, the both can clearly be distinguished from each other. Also, the two combustion chambers provided in the housing are the chambers for accommodating gas generating means. In a view of the above, even when the ignition means includes a transfer charge and the transfer charge is stored in a defined space (hereinafter, referred to as "accommodating chamber"), the accommodating chamber for the this transfer charge and the combustion chamber accommodating the gas generating means can clearly be distinguished from each other.

When the ignition means which ignites and burns the gas generating means includes at least two igniters to be actuated by the impact, it is preferable that these igniters are provided in one initiator collar to be aligned to each other in the axial directions. Also, when transfer charge to be ignited and burnt due to actuation of the igniter is included to the ignition means, it is preferable to employ a structure such that the transfer charge is provided for each igniter, the transfer charge is independently ignited and burnt at each igniter, and the flame of the transfer charge corresponding to any one of the igniters does not ignite a transfer charge corresponding to the other igniter directly. An example of such a structure is one in which a igniter is arranged in the independent igniter accommodating chambers respectively and a transfer charge is disposed in these igniter accommodating chambers, or one in which a transfer charge is respectively disposed in any position inside the independent combustion chambers where the transfer charge can be ignited and burnt.

When the transfer charge is distributed for the respective igniters in this manner, the gas generating means stored in two combustion chambers are ignited and burnt by flames generated by combustion of the transfer charges in the different sections. In other words, according to the ignition timings of the igniters, the transfer charges in the respective sections are burnt and the gas generating means in the respective combustion chambers can be independently burnt, and thereby the operation performance of the gas generator can be adjusted arbitrarily.

Therefore, when an igniting timing is changed at the respective igniters, the transfer charges distributed to the respective igniters can be independently burnt and igniting/combustion timings of the gas generating means in the respective combustion chambers can be staggered accordingly, whereby the actuation output of the gas generator can be adjusted arbitrarily.

In the two combustion chambers provided in the housing, one combustion chamber may be provided in the axial direction of the igniters and the other combustion chamber may be provided in the radial direction of the ignition means. Furthermore, when the operation performance of the gas generator, particularly a change with the passage of time in the gas discharge amount is distinguishingly adjusted, the gas generating means which are different from each other in at least one of a burning rate, a composition, a composition ratio and an amount are accommodated respectively in the independent combustion chambers, and these gas generating means can be independently ignited and burnt at optional timings. Further, the gas generating means to generate a different amount of gas per a unit time may be stored in the respective chambers.

As the gas generating means, in addition to an azide gas generating agent based on an inorganic azide which has been widely used, for example, a sodium azide, a non-azide gas generating agent not based on an inorganic azide may be used. However, from the view of safety, the non-azide gas generating agent is preferable, and as the non-azide gas generating composition, for example, a composition containing a nitrogen containing organic compound such as a tetrazole, a triazole or a metallic salt thereof and an oxygen containing oxidant such as an alkali metal nitrate, a composition using a triaminoguanidine nitrate, a carbohydroazide, a nitroguanidine and the like as a fuel and nitrogen source and using a nitrate, chlorate, a perchlorate or the like of an alkali metal or an alkaline earth metal as an oxidant, and the like may be employed. In addition, the gas generating means can be suitably selected according to requirements such as a burning rate, a non-toxicity, a combustion temperature, a decomposition starting temperature. In the case of using the gas generating means having different burning rates in the respective combustion chambers, may be used the gas generating means having the different composition or composition ratio itself, such that, for example, the inorganic azide such as the sodium azide or the non-azide such as the nitroguanidine is used as the fuel and the nitrogen source. Alternatively, the gas generating means obtained by changing a shape of the composition to a pellet shape, a wafer shape, a hollow cylindrical shape, a disc shape, a single hole body shape or a porous body shape, or the gas generating means obtained by changing a surface area according to a size of a formed body may be used. In particular, when the gas generating means is formed into the porous body with a plurality of through holes, an arrangement of the holes is not particularly limited, however, in order to stabilize a performance of the gas generator, an arrangement structure such that a distance between an outer end portion of the formed body and a center of the hole and a distance between each center of the holes are substantially equal to each other is preferable. Concretely, in the cylindrical body having a circular cross section, for example, a preferred structure is such that one hole is arranged at the center and six holes are formed around the hole so that the center of each hole is the apex of regular triangles of the equal distance between the holes. Further, in the same manner, an arrangement such that eighteen holes are formed around one hole at the center may be also suggested. However, the number of the holes and the arrangement structure are determined in connection with an easiness for manufacturing the gas generating agent, a manufacture cost and a performance, and are not particularly limited.

Between two combustion chambers, the chamber provided outside in the radial direction may contain a coolant means for cooling the combustion gas generated due to combustion of the gas generating means on the side near a peripheral wall of the housing. The coolant means is provided in the housing for the purpose of cooling and/or purifying the combustion gas generated due to the combustion of the gas generating means. For example, in addition to a filter for purifying the combustion gas and/or a coolant for cooling the generated combustion gas which have been conventionally used, a layered wire mesh filter obtained by forming a wire mesh made of a suitable material into an annular layered body and compress-molding the body, and the like can be used. The layered wire mesh coolant can be preferably obtained by forming a plain stitch stainless steel wire mesh into a cylindrical body, folding one end portion of the cylindrical body repeatedly and outwardly so as to form an annular layered body and then compress-molding the layered body in a die, or by forming a plain stitch stainless steel wire mesh into a cylindrical body, pressing the cylindrical body in the radial direction to form a plate body, rolling the plate body into a cylindrical shape at many times to form the layered body and then compress-molding it in a die. Further, the coolant may have a double structure with different layered wire mesh bodies at inside and outside such that the inner layer has a function for protecting the coolant means and the outer layer has a function for suppressing expansion of the coolant means. In this case, expansion of the coolant can be suppressed by supporting the outer periphery of the coolant means with an outer layer such as the layered wire mesh body, the porous cylindrical body, or the annular belt body.

And in the case of the gas generator in which the combustion gases generated due to the combustion of the gas generating means stored in two combustion chambers reach the gas discharge port via different flow paths respectively, and that the gas generating means stored in one combustion chamber never directly ignited due to the combustion gas generated in the other combustion chamber, the gas generating means in the respective combustion chambers are burnt completely independently, and therefore, independent ignition and combustion of the gas generating means in each combustion chamber can be realized more securely. Consequently, even when activation timings of two igniters are staggered significantly, the flame of the gas generating means in one combustion chamber ignited by the firstly actuated igniter does not burn the gas generating means in the other combustion chamber, so that a stable output can be obtained. This kind of gas generator can be achieved, for example, by arranging a flow-passage forming member in the housing to form the flow-passage and introducing the combustion gas generated in the first combustion chamber to the coolant means directly.

The above housing can be obtained by forming a diffuser shell having a gas discharge port or gas discharge ports and a closure shell, which forms a storing space together with the diffuser shell, with a casting, a forging, a press-working or the like, and joining both shells. The joining of both shells can be performed by various kinds of welding methods, for example, an electron beam welding, a laser welding, a TIG arc welding, a projection welding, or the like. When the diffuser shell and the closure shell are formed by press-working various kinds of steel plates such as the stainless steel plate, manufacturing is made easy and a manufacturing cost is reduced. Further, forming both shells into a simple shape such as cylindrical shape makes the press-working of the shells easy. With respect to the material of the diffuser shell and the closure shell, the stainless steel is preferable, and the material obtained by applying a nickel plating to the steel plate can be also acceptable.

In the above housing, the ignition means to be actuated by detecting the impact and ignite and burn the gas generating means is further installed. In the gas generator according to the present invention, as the ignition means, an electric ignition type ignition means to be activated by an electric signal (or an activating signal) transmitted from an impact sensor or the like which detects the impact is used. The electric ignition type ignition means comprises an igniter to be activated by the electric signal transmitted from the electric sensor which exclusively detects the impact by means of an electric mechanism such as a semiconductor type acceleration sensor or the like, and a transfer charge to be ignited and burnt by the activation of the igniter.

The gas generator for an air bag mentioned above is accommodated in a module case together with an air bag (bag body) to be inflated by introducing gas generated in the gas generator, which constitutes an air bag apparatus. In this air bag apparatus, the gas generator is actuated when reacting on the impact detected by the impact sensor to discharge the combustion gas from the gas discharge port of the housing. The combustion gas flows into the air bag so that the air bag breaks a module cover to inflate and form a cushion absorbing an impact between a hard structure in the vehicle and an occupant.

Gas Generator Satisfying Requirement (2)

As such a gas generator for an air bag, any structure is applicable as long as a transfer charge is burnt by an igniter and further a gas generating agent is burnt. By satisfying an area ratio (A/B), an ignition flame, which has a sufficiently smaller area than the area of the transfer charge, can enter into the depths of the transfer charge accommodating chamber when the igniter is actuated and ignited, so that the transfer charge can be securely burnt. In order to realize such a performance reliably, the area ratio (A/B) is preferably 0.01 to 0.3, more preferably 0.01 to 0.1.

And in the present invention, the below means to satisfying the area ratio (A/B) can be used;

(i) means to satisfy the area ratio (A/B) such that an igniter in the ignition means is made smaller, (ii) means to satisfy the area ratio (A/B) such that a top surface of the igniter in the ignition means is covered with a cup having one or more holes, and (iii) means to satisfy the area ratio (A/B) such that a flame is discharged exclusively from a portion corresponding to a flame discharge portion of the igniter or preferentially from a portion corresponding to the flame discharge portion, in the ignition means, These means can be used alone or can be used in a combination of two or three.

In the above, the state that "the flame discharge portion of the igniter faces at least one portion of the transfer charge" can be a state such that the flame discharge portion of the igniter faces the transfer charge right in the axial direction as well as an arrangement such that almost all ignition flames from the igniter can reach the transfer charge even though they do not face each other right.

Also, the means (iii) can include a case such that at least the top surface of the igniter is covered with the cover member and flame is discharged exclusively from a portion corresponding to the flame discharge portion of the cover member or preferentially from the portion corresponding to the flame discharge port. An example of such a means can be a means to form a hole, a squeeze or a rupturable portion in the cover member covering the top surface of the igniter.

Also, the present invention is a gas generator for an air bag comprising an ignition means which includes an igniter to be actuated by the impact and a transfer charge, and a gas generating means which is to be ignited/burnt by the ignition means and generate combustion gas for inflating an air bag are stored in a housing with a gas discharge port(s), and the gas generator has a structure such that, in the ignition means, the igniter and the transfer charge face each other right in the radial direction, being separated from each other, and/or a flame-transferring hole communicating with the combustion chamber and the transfer charge is arranged so as not to be face each other right, wherein the area ratio (A/B) is satisfied. Also, in order to achieve this, the means (i) to (iii) can be employed.

Such a gas generator for an air bag can be employed in an arrangement such that the igniter and the transfer charge face each other right in the axial direction, being separated from each other, and in an arrangement such that the flame-transferring hole communicating with the combustion chamber and the transfer charge is provided so as not to face each other right in the radial direction can be employed. Also the generator can be employed when both arrangements are provided. An example of the arrangement such that the flame-transferring hole communicating with the combustion chamber and the transfer charge is provided so as not to face each other right in the radial direction may be the structure shown in FIG. 1. On the contrary, an example of an arrangement such that they face each other right may be the structure shown in FIG. 2. Still, the arrangement such that they face each other right can be one such that all or a portion of flame-transferring holes are arranged to contact with the transfer charge directly, or one such that they contact with each other, interposing a member to be melt or ruptured due to combustion of the transfer charge. The present invention is particularly effective for a case such that the transfer charge is positioned more profoundly than the transfer charge.

In such a gas generator for an air bag, when the igniter is actuated and ignited, a flame generated passes through a hole and advances with a small width straightly so that the transfer charge is suppressed from being pressed. Also, since the flame reaches the depths of the transfer charge, the transfer charge can be completely burnt instantaneously. As a result, regardless of the relationship among the positions of the igniter, the transfer charge and the flame-transferring hole, the subsequent combustion performance up to the combustion of the gas generating agent can be proceeded smoothly and securely.

In the gas generator for an air bag of the present invention, constituent elements other than the above solving means are not limited particularly, but constituent elements similar to those of a known gas generator for an air bag can be employed as well as the modification in the elements made by those skilled in the art.

For example, the gas generator for an air bag of the present invention can be employed in a structure such that two or more ignition means are provided and two or more gas generating means to be ignited and burnt independently by the respective ignition means in order to generate combustion gas for inflating an air bag are provided.

As the gas generating means, in addition to an azide gas generating agent based on an inorganic azide which has been widely used, for example, a sodium azide, a non-azide gas generating agent not based on an inorganic azide may be used. However, from the view of safety, the non-azide gas generating agent is preferable, and as the non-azide gas generating composition, for example, a composition containing a nitrogen containing organic compound such as a tetrazole, a triazole or a metallic salt thereof and an oxygen containing oxidant such as an alkali metal nitrate, a composition using a triaminoguanidine nitrate, a carbohydroazide, a nitroguanidine and the like as a fuel and nitrogen source and using a nitrate, chlorate, a perchlorate or the like of an alkali metal or an alkaline earth metal as an oxidant, and the like may be employed.

In addition, the gas generating means can be suitably selected according to requirements such as a burning rate, a non-toxicity, a combustion temperature, a decomposition starting temperature. In the case of using the gas generating means having different burning rates in the respective combustion chambers, may be used the gas generating means having the different composition or composition ratio itself, such that, for example, the inorganic azide such as the sodium azide or the non-azide such as the nitroguanidine is used as the fuel and the nitrogen source. Alternatively, the gas generating means obtained by changing a shape of the composition to a pellet shape, a wafer shape, a hollow cylindrical shape, a disc shape, a single hole body shape or a porous body shape, or the gas generating means obtained by changing a surface area according to a size of a formed body may be used. In particular, when the gas generating means is formed into the porous body with a plurality of through holes, an arrangement of the holes is not particularly limited, however, in order to stabilize a performance of the gas generator, an arrangement structure such that a distance between an outer end portion of the formed body and a center of the hole and a distance between each center of the holes are substantially equal to each other is preferable. Concretely, in the cylindrical body having a circular cross section, for example, a preferred structure is such that one hole is arranged at the center and six holes are formed around the hole so that the center of each hole is the apex of regular triangles of the equal distance between the holes. Further, in the same manner, an arrangement such that eighteen holes are formed around one hole at the center may be also suggested. However, the number of the holes and the arrangement structure are determined in connection with an easiness for manufacturing the gas generating agent, a manufacture cost and a performance, and are not particularly limited.

The housing may contain a coolant means for cooling the combustion gas generated due to combustion of the gas generating means. The coolant means is provided in the housing for the purpose of cooling and/or purifying the combustion gas generated due to the combustion of the gas generating means. For example, in addition to a filter for purifying the combustion gas and/or a coolant for cooling the generated combustion gas which have been conventionally used, a layered wire mesh filter obtained by forming a wire mesh made of a suitable material into an annular layered body and compress-molding, and the like can be used. The layered wire mesh coolant can be preferably obtained by forming a plain stitch stainless steel wire mesh in a cylindrical body, folding one end portion of the cylindrical body repeatedly and outwardly so as to form an annular layered body and then compress-molding the layered body in a die, or by forming a plain stitch stainless steel wire mesh in a cylindrical body, pressing the cylindrical body in the radial direction so as to form a plate body, rolling the plate body in a cylindrical shape at many times so as to form the layered body and then compress-molding it in the die. Further, the coolant with a double structure with different layered wire mesh bodies at an inner side and an outer side thereof, which has a function for protecting the coolant means in the inner side and a function for suppressing expansion of the coolant means in the outer side, may be used. In this case, it is possible to restrict the expansion by supporting an outer periphery of the coolant means with an outer layer such as the layered wire mesh body, the porous cylindrical body, the annular belt body.

The housing mentioned above can be obtained by forming a diffuser shell having a gas discharge port or gas discharge ports and a closure shell, which forms a storing space together with the diffuser shell, with a casting, a forging, a press-working or the like, and joining both shells. The joining of both shells can be performed by various kinds of welding methods, for example, an electron beam welding, a laser welding, a TIG arc welding, a projection welding, or the like. Forming the diffuser shell and the closure shell by press-working various kinds of steel plates such as the stainless steel plate makes manufacture easy and reduces a manufacturing cost. Further, forming both shells into a simple shape as cylindrical shape makes the press-working of the shells easy. With respect to the material of the diffuser shell and the closure shell, the stainless steel is preferable, and the material obtained by applying a nickel plating to the steel plate may be also acceptable.

The gas generator for an air bag is accommodated in a module case together with an air bag (bag body) to introduce a gas generated in the gas generator and inflate, so as to form an air bag apparatus. In this air bag apparatus, the gas generator is actuated when reacting on the impact detected by the impact sensor, and the combustion gas is discharged from the gas discharge port of the housing. The combustion gas flows into the air bag, and thereby the air bag breaks a module cover to inflate and form a cushion absorbing the impact between a hard member in the vehicle and an occupant.

Gas Generator Having Requirement (3)

By setting a ratio between a space volume occupied by the transfer charge and a remaining space volume in the ignition means accommodating chamber not occupied by the transfer charge within a predetermined range as well as a filling density of the transfer charge, combustion is improved in the spaces and the transfer charge can be ignited more evenly, and thereby the subsequent combustion of the gas generating agent in the combustion chamber is performed smoothly and stably. Therefore, the reliability of a product may be improved.

Also, the respective gas generators described above can be employed to a structure such that two or more combustion chambers accommodating the gas generating means are arranged in the housing, and two or more ignition means for igniting/burning the respective gas generating means are arranged in the two or more combustion chambers, and, naturally, the generators are also employed to a structure such that one combustion chamber and one igniter are provided.

The gas generating means mentioned above is to inflate an air bag for restraining an occupant of a vehicle with a combustion gas generated due to the combustion thereof. Therefore, the combustion gas generated due to combustion of the transfer charge to burn the gas generating means when the ignition means is ignited and burnt the igniter is to burn the gas generating means but it is not to inflate the air bag directly. In a view of the above, they can clearly be distinguished from each other.

Also, the combustion chamber provided in the housing is just to accommodate the gas generating means. Therefore, when the ignition means comprises the transfer charge stored in a defined space, the chamber accommodating the transfer charge and the combustion chamber accommodating the gas generating means can clearly be distinguished from each other.

In the gas generator for an air bag of the present invention, constituent elements other than the above solving means are not limited particularly, but constituent elements similar to those of a known gas generator for an air bag can be employed as well as the elements modified by those skilled in the art.

For example, when the ignition means which ignites/burns the gas generating means mentioned above includes two or more igniters, it is preferable that the igniters are provided in one initiator collar to be aligned to each other in the radial direction.

Also, it is preferable that, when two or more igniters are provided, the transfer charge contained in the ignition means are distributed to the respective igniters and is ignited and burnt independently at each igniter, and a flame generated due to combustion of the transfer charge at any one of igniters never ignites the transfer charges at the other igniters. An example of such a structure can be an arrangement such that the respective igniters are provided in the ignition means accommodating chambers independent from each other and the transfer charges are arranged in the respective ignition means accommodating chambers, or an arrangement such that the transfer charges are arranged in the respective combustion chambers independent from each other where they are to be ignited and burnt due to actuations of the igniters.

In the above manner, when the transfer charges are distributed to the respective igniters, the gas generating means stored in the two combustion chambers are ignited and burnt by flames generated by combustion of the respective different transfer charge. Namely, the transfer charges at the respective igniters are burnt according to the activation timings of the igniters and the gas generating means in the respective combustion chambers can be burnt separately, and thereby the operation performance of the gas generator can be adjusted arbitrarily.

As the gas generating means, in addition to an azide gas generating agent based on an inorganic azide which has been widely used, for example, a sodium azide, a non-azide gas generating agent not based on an inorganic azide may be used. However, from the view of safety, the non-azide gas generating agent is preferable, and as the non-azide gas generating composition, for example, a composition containing a nitrogen containing organic compound such as a tetrazole, a triazole or a metallic salt thereof and an oxygen containing oxidant such as an alkali metal nitrate, a composition using a triaminoguanidine nitrate, a carbohydroazide, a nitroguanidine and the like as a fuel and nitrogen source and using a nitrate, a chlorate, a perchlorate or the like of an alkali metal or an alkaline earth metal as an oxidant, and the like may be employed.

In addition, the gas generating means can be suitably selected according to requirements such as a burning rate, a non-toxicity, a combustion temperature, a decomposition starting temperature. In the case of using the gas generating means having different burning rates in the respective combustion chambers, may be used the gas generating means having the different composition or composition ratio itself, such that, for example, the inorganic azide such as the sodium azide or the non-azide such as the nitroguanidine is used as the fuel and the nitrogen source. Alternatively, the gas generating means obtained by changing a shape of the composition to a pellet shape, a wafer shape, a hollow cylindrical shape, a disc shape, a single hole body shape or a porous body shape, or the gas generating means obtained by changing a surface area according to a size of a formed body may be used. In particular, when the gas generating means is formed into the porous body with a plurality of through holes, an arrangement of the holes is not particularly limited, however, in order to stabilize a performance of the gas generator, an arrangement structure such that a distance between an outer end portion of the formed body and a center of the hole and a distance between each center of the holes are substantially equal to each other is preferable. Concretely, in the cylindrical body having a circular cross section, for example, a preferred structure is such that one hole is arranged at the center and six holes are formed around the hole so that the center of each hole is the apex of regular triangles of the equal distance between the holes. Further, in the same manner, an arrangement such that eighteen holes are formed around one hole at the center may be also suggested. However, the number of the holes and the arrangement structure are determined in connection with an easiness for manufacturing the gas generating agent, a manufacture cost and a performance, and are not particularly limited. As the transfer charge, material similar to the gas generating means can be used.

The housing may further contain a coolant means for cooling the combustion gas generated due to combustion of the gas generating means on the peripheral wall side thereof. The coolant means is provided in the housing for the purpose of cooling and/or purifying the combustion gas generated due to the combustion of the gas generating means. For example, in addition to a filter for purifying the combustion gas and/or a coolant for cooling the generated combustion gas which have been conventionally used, a layered wire mesh filter obtained by forming a wire mesh made of a suitable material into an annular layered body and compress-molding, and the like can be used. The layered wire mesh coolant can be preferably obtained by forming a plain stitch stainless steel wire mesh in a cylindrical body, folding one end portion of the cylindrical body repeatedly and outwardly so as to form an annular layered body and then compress-molding the layered body in a die, or by forming a plain stitch stainless steel wire mesh in a cylindrical body, pressing the cylindrical body in the radial direction so as to form a plate body, rolling the plate body in a cylindrical shape at many times so as to form the layered body and then compress-molding it in the die. Further, the coolant with a double structure with different layered wire mesh bodies at an inner side and an outer side thereof, which has a function for protecting the coolant means in the inner side and a function for suppressing expansion of the coolant means in the outer side, may be used. In this case, it is possible to restrict the expansion by supporting an outer periphery of the coolant means with an outer periphery of the coolant means with an outer layer such as the layered wire mesh body, the porous cylindrical body, the annular belt body.

And in the case of the gas generator, with two or more combustion chambers, in which the combustion gases generated due to the combustion of the gas generating means stored in two combustion chambers reach the gas discharge port via different flow paths respectively, and that the gas generating means stored in one combustion chamber never directly ignited due to the combustion gas generated in the other combustion chamber, the gas generating means in the respective combustion chambers are burnt completely independently, and therefore, independent ignition and combustion of the gas generating means in each combustion chamber can be realized more securely. Consequently, even when activation timings of two igniters are staggered significantly, the flame of the gas generating means in one combustion chamber ignited by the firstly actuated igniter does not burn the gas generating means in the other combustion chamber, so that a stable output can be obtained. This kind of gas generator can be achieved, for example, by arranging a flow-passage forming member in the housing to form the flow-passage and introducing the combustion gas generated in the first combustion chamber to the coolant means directly.

The housing mentioned above can be obtained by forming a diffuser shell having a gas discharge port or gas discharge ports and a closure shell, which forms a storing space together with the diffuser shell, with a casting, a forging, a press-working or the like, and joining both shells. The joining of both shells can be performed by various kinds of welding methods, for example, an electron beam welding, a laser welding, a TIG arc welding, a projection welding, or the like. Forming the diffuser shell and the closure shell by press-working various kinds of steel plates such as the stainless steel plate makes manufacture easy and reduces a manufacturing cost. Further, forming both shells into a simple shape as cylindrical shape makes the press-working of the shells easy. With respect to the material of the diffuser shell and the closure shell, the stainless steel is preferable, and the material obtained by applying a nickel plating to the steel plate may be also acceptable.

In the gas generator according to the present invention, as the ignition means stored in the housing mentioned above, an electric ignition type ignition means to be activated by an electric signal (or an activating signal) transmitted from an impact sensor or the like which detects the impact is used. The electric ignition type ignition means comprises an igniter to be activated by the electric signal transmitted from the electric sensor which detects the impact exclusively by means of an electric mechanism such as a semiconductor type acceleration sensor or the like, and a transfer charge to be ignited and burnt by the activation of the igniter.

The gas generator for an air bag mentioned above is accommodated in a module case together with an air bag (bag body) to introduce a gas generated by the gas generator and inflate, which constitutes air bag apparatus. In this air bag apparatus, the gas generator is actuated, when reacting on the impact detected by the impact sensor, to discharge the combustion gas from the gas discharge port of the housing. The combustion gas flows into the air bag, and thereby the air bag breaks a module cover to inflate and form a cushion absorbing an impact between a hard portion in the vehicle and an occupant.

Gas Generator Satisfying Requirement (4)

In the present invention, it is preferable that the communication hole is sealed by the metal thin plate from the inwall surface side of the first combustion chamber.

The communication hole which allows communication between the first combustion chamber and the second combustion chamber is sealed by attaching the first metal thin plate on the hole with adhesive (this adhesive is "the first adhesive layer"), attaching the second metal thin plate on the first metal thin plate with adhesive (this adhesive is "the second adhesive layer"), and further attaching the third metal thin plate, and the subsequent thin plates if required, on the second thin plate by adhesive (this adhesive is "the third adhesive layer" or the like). It is preferable that the first metal thin plate has the first adhesive layer on the whole surface or a part of the surface where the communication hole does not contact, and the second and the subsequent thin plates have the second adhesive layer (or the third, fourth and the subsequent adhesive layers) on the whole surface.

The thicknesses of the metal thin plate and the adhesive layer are determined properly according to the kind and the amount of the gas generating means, the size of the communication hole and the like, so that the gas generator for an air bag actuates appropriately. However, for example, the total thickness of plural metal thin plates (except for the adhesive layer) can be set to preferably 10 to 200 µm, more preferably 20 to 100 µm, and a thickness of the respective metal thin plate can be set to 5 to 100 µm, more preferably 10 to 50 µm, further preferably 25 to 55 µm. Also, a thickness of the metal thin plate and the subsequent thin plates is selected in the above range accordingly.

When the first and second adhesive layers are used as the adhesive layer, the thicknesses of the first adhesive layer and the thickness of the second adhesive layer are respectively set to preferably 10 to 50 µm, more preferably 20 to 40 µm.

Thus, in the communication hole closed by a plurality of metal thin plates via the first and second adhesives or the like, when the gas generating means in the first combustion chamber is burnt to increase a pressure and a large pressure is applied to the entire metal thin plate, the metal thin plate is prevented from being broken as the total thickness of the plural metal thin plates is made thick. When the thickness of one metal thin plate is made as much as that of two plates, the metal thin plate is not broken by the pressure. However, mostly, the metal thin plate is attached on a non-plane surface corresponding to a shape of a portion where the communication hole is formed, for example, in a curved surface, the plate can possibly peel off when the force to spring back to be flat becomes larger than that of the adhesive layer. Therefore, like the present invention, by using a plurality of metal thin plates, the peeling-off can be prevented.

Also, when the gas generating means in the second combustion chamber burns to increase a pressure, the adhering force of the first adhesive layer is sufficiently smaller than the above pressure, so that the two metal thin plates are peeled off easily.

The gas generator for an air bag according to the present invention is desirable because an igniting ability can be improved by increasing the pressure in the first gas generating chamber in case of arranging the gas generating means with a very low igniting ability in the first combustion chamber.

Examples of the gas generating means suitable for the gas generator for an air bag of the present invention can be a gas generating agent containing guanidine derivative and basic metal nitrate, and a gas generating agent containing a binder and/or an additive serving as slug forming agent.

The gas generator for an air bag of the present invention is accommodated in a module case with an air bag (bag body) to introduce a gas generated by the gas generator and inflate, thus forming an air bag apparatus. In this air bag apparatus, the gas generator is actuated, when reacting upon the impact detected by a impact sensor, to discharge the combustion gas from the gas discharge port of the housing. The combustion gas flows into the air bag, and thereby the air bag breaks a module cover to inflate and form a cushion absorbing the impact between a hard structure in the vehicle and an occupant.

Technical Advantages of the Invention

According to the present invention, ignition and combustion of the gas generating means in one combustion chamber never ignites the gas generating means in the other combustion chamber, malfunction is prevented so that safety and reliability of the gas generator can be improved.

According to the present invention, a series of combustion performances from the ignition of the igniter to combustion of the transfer charge and the gas generating agent are performed smoothly with regardless of combustion activity of the transfer charge and the relationship in arrangement of the igniter, the transfer charge (the transfer charge accommodating chamber) and the flame-transferring hole in particular.

According to the present invention, since the ignition and burning of the transfer charge in the ignition means are performed smoothly and stably, the subsequent combustion of the gas generating agent in the combustion chamber is performed smoothly and stably, and thereby reliability of a product can be improved.

According to the present invention, ignition and burning of the gas generating means in one combustion chamber never ignites the gas generating means in the other combustion chamber, malfunction is prevented so that safety and reliability of the gas generator can be improved. Also, even when a gas generating means with a low ignition ability is used, ignition and combustion of the gas generating means can be performed smoothly.

EXPLANATION OF REFERENCE NUMERALS

Figure 1:
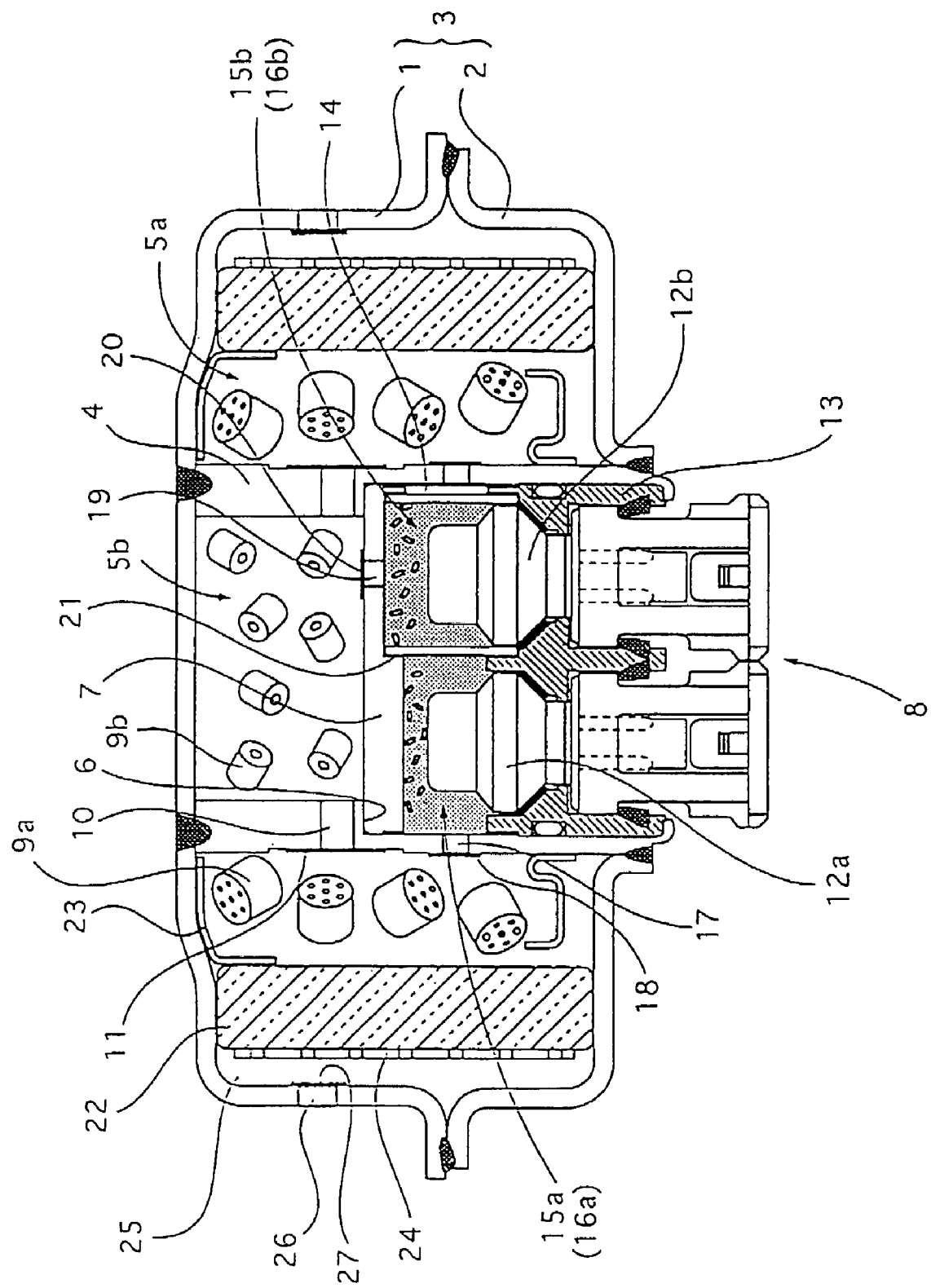
FIG. 1 is a vertical cross sectional view showing one embodiment of a gas generator of the present invention.

In the drawings, reference numeral 3 denotes a housing, 5a denotes a first combustion chamber, 5b denotes a second combustion chamber, 7 denotes a partition wall, 9a denotes a first gas generating agent, 9b denotes a second gas generating agent, 12a denotes a first igniter, 12b denotes a second igniter, 13 denotes an initiator collar, 22 denotes coolant/filter, 305a denotes a first combustion chamber, 305b denotes a second combustion chamber, 307 denotes a partition wall, 309a denotes a first gas generating agent, 309b denotes a second gas generating agent, 312a denotes a first igniter, 312b denotes a second igniter, 313 denotes an initiator collar, 350 denotes a sectional circular member, 360 denotes a seal cup member, 370 denotes an ignition means accommodating chamber, and 382 denotes an igniter fixing member.

In the drawings, reference numeral 1101 denotes a diffuser shell, 1102 denotes a closure shell, 1103 denotes a housing, 1105 denotes a combustion chamber, 1105a denotes a first combustion chamber, 1105b denotes a second combustion chamber, 1109 denotes a gas generating agent, 1109a and 1109b denote gas generating agents, 1112 denotes an igniter, 1112a denotes a first igniter, 1112b denotes a second igniter, 1116 and 1116a denote transfer charges, 1161 denotes a transfer charge accommodating chamber, 1170 denotes an ignition means accommodating chamber, 1190 denotes a cup, and 1191 denotes a hole.

In the drawings, reference numeral 2003 denotes a housing, 2008 denotes an ignition means accommodating chamber, 2012a and 2012b denote igniters, 2015a and 2015b denote transfer charge accommodating chambers, 2016a and 2016b denote transfer charges, 2115a and 2115b denote transfer charge accommodating chambers, 2116a and 2116b denote transfer charges, 2312a and 2312b denote igniters, 2361 denotes a transfer charge accommodating chamber, 2316a denotes a transfer charge, 2380 denotes an ignition means accommodating chamber, 2390 denotes a space, 2404 denotes an igniter, 2405 denotes a transfer charge, 2423 denotes a transfer charge accommodating chamber, 2455 denotes an ignition means accommodating chamber, and 2460 denotes a space.

In the drawings, reference numeral 3003 denotes a housing, 3005a denotes a first combustion chamber, 3005b denotes a second combustion chamber, 3007 denotes a partition wall, 3009a denotes a first gas generating agent, 3009b denotes a second gas generating agent, 3012a denotes a first igniter, 3012b denotes a second igniter, 3013 denotes an initiator collar, and 3022 denotes a coolant/filter.

PREFERRED EMBODIMENTS OF THE INVENTION

A gas generator having the requirement (1), a gas generator having the requirement (2), a gas generator having the requirement (3) and a gas generator having the requirement (4) will be described respectively in Embodiments 1 to 3, 4 and 5, 6 to 10, and 11. In addition, an air bag apparatus to which each gas generator has been applied will be described in Embodiment 13.

Embodiment 1

FIG. 1 is a vertical cross sectional view of a first embodiment of a gas generator for an air bag according to the present invention, which shows a structure particularly suitable for being arranged in a driver side.

The gas generator comprises a housing 3 which is formed by joining a diffuser shell 1 provided with a gas discharge port and a closure shell 2 forming an inner accommodating space with the diffuser shell, and an inner-cylindrical member 4 in a substantially cylindrical shape which is arranged in the housing 3 to form a first combustion chamber in the outside thereof. Further, a stepped notch portion 6 is provided inside the inner-cylindrical member, a partition wall 7 formed in a substantially disk-shape is arranged in the stepped notch portion, the partition wall further divides the interior of an inner cylinder into two chambers so as to form a second combustion chamber 5b in the diffuser shell side (in the upper space side) and an ignition means accommodating chamber 8 in the closure shell side (in the lower space side), respectively. As a result, in this gas generator, the first combustion chamber 5a and the second combustion chamber 5b are concentrically provided in the housing 3 and arranged in adjacent to each other in the radial direction of the housing. Gas generating agents (9a, 9b) which are to be burnt by ignition means activated on the impact in order to generate combustion gas are stored in the first and second combustion chambers, and the ignition means to be actuated on the impact is stored in the ignition means accommodating chamber 8. A through hole 10 is provided in the inner-cylindrical member 4 which defines the first combustion chamber 5a and the second combustion chamber 5b, and the through hole is closed by a seal tape 11. And, since the seal tape 11 is ruptured when the gas generating agent is burnt, both combustion chambers can communicate with each other by the through hole 10.

This seal tape 11 needs to be adjusted in its material and thickness so that the seal tape is not ruptured when the gas generating agent 9a in the first combustion chamber 5a is burnt but it is ruptured exclusively when the gas generating agent 9b in the second combustion chamber 5b is burnt. In the present embodiment, a stainless steel tape having a tensile strength of 54 kg/mm² and a thickness of 40 μm is used. Also, the through hole 10 does not function to control an internal pressure in the combustion chamber 5b because an opening area thereof is formed larger than a gas discharge port 26b.

The ignition means comprises two electric ignition type igniters (12a, 12b) to be activated by an activating signal outputted when the sensor detects the impact, and the igniters are provided in parallel to each other in one initiator collar 13 so as to expose head portions thereof. By providing two igniters (12a, 12b) to one initiator collar 13 in this manner, two igniters are fixed in the initiator collar 13 to form a single member, thereby facilitating an assembly to the gas generator. Particularly in the gas generator illustrated in this drawing, since the initiator collar 13 is formed in a size capable of being inserted into the inner-cylindrical member 4, the initiator collar 13 with two igniters 12a and 12b is inserted into the inner cylinder 4, and then the igniters can be easily and securely fixed by crimping the lower end of the inner-cylindrical member 4 so as to fix the initiator collar. Further, when arranging two igniters (12a, 12b) in the initiator collar 13, a direction of each igniter can be easily controlled. These two igniters are arranged eccentrically to a center axis of the housing in the drawing. When the respective igniters (12a, 12b) are arranged in the same direction, lead wire 50 connecting the igniters (12a, 12b) and a control unit to each other can be drawn out on the same plane and in the same direction. The lead wires 50 are connected to the respective igniters (12a, 12b) via connectors 50a, and these connectors are arranged in parallel to each other on the same plane. The lead wire transmitting an electric signal (activating signal) to the igniter can be drawn out in a direction perpendicular to the axial direction of the housing (that is, a radial direction of the housing) by forming the connector in a L-letter shape. At this time, the lead wires connected to the respective igniters can also be drawn out in the same direction.

In this embodiment, a substantially cylindrical separating cylinder 14 is arranged in a space between the initiator collar 13 and the partition wall 7 so as to surround one igniter 12b (hereinafter, referred to as "a second igniter"), a first transfer charge accommodating chamber 15a defined in the outside of the separating cylinder 14 and a second transfer charge accommodating chamber 15b are defined in the inside thereof respectively, and the igniter and the transfer charge constituting the ignition means together with the igniters are stored in the respective accommodating chambers 15a and 15b. As a result, transfer charges (16a, 16b) constituting the ignition means together with the igniters are securely partitioned for the respective igniters (12a, 12b). When the transfer charge 16a in the first transfer charge accommodating chamber 15a is burnt, the seal tape 18 closing the flame transferring hole 17 provided on the inner-cylindrical member 4 is ruptured, whereby the first transfer charge accommodating chamber 15a communicates with the first combustion chamber 5a. And when the transfer charge 16b in the second transfer charge accommodating chamber 15b is burnt, the seal tape 20 closing the flame transferring hole 19 provided on the partition wall 7 is ruptured, whereby the second transfer charge accommodating chamber 15b communicates with the second combustion chamber 5b. Accordingly, in this gas generator, at activation, a flame generated due to ignition (activation) of the first igniter 12a ignites and burns the transfer charge 16a in the accommodating chamber 15a and then, the flame thereof passes through the flame transferring hole 17 formed in the inner-cylindrical member 4. And then, the flame ignites and burns a gas generating agent 9a with seven holes in the first combustion chamber 5a which positions in the radial direction of the chamber 15a. And the second igniter 12b ignites and burns the second transfer charge 16b stored in the accommodating chamber 15b and the flame thereof passes through the flame transferring hole 19 provided in the axial direction of the accommodating chamber 15b. And then, the flame ignites and burns a gas generating agent 9b with a single hole in the second combustion chamber 5b which is disposed on the extension thereof. A combustion gas generated in the second combustion chamber 9b passes through the through hole 10 provided in the diffuser shell side 1 of the inner-cylindrical member 4 and flows into the first combustion chamber 5a.

Particularly, in the gas generator shown in FIG. 1, there is a case that the second igniter 12b and the first igniter 12a are ignited simultaneously in order to stabilize an activation performance, but the former 12b is never ignited earlier than the latter 12a. In other words, the gas generating agent 9b stored in the second combustion chamber 5b is burnt simultaneously with or subsequently to the combustion of the gas generating agent 9a stored in the first combustion chamber 5a. When the gas generating agent 9a in the first combustion chamber 5a burns earlier than the second gas generating agent 9b, the seal tape 11 has the predetermined tensile strength and thickness as described above, and thereby it is not ruptured by the burning of the first gas generating agent 9a but it is ruptured only by the burning of the second gas generating agent 9b.

Also, in the gas generator illustrated in this drawing, the separating cylinder 14 positioned between the initiator collar and the partition wall is arranged so that hole portions 21 corresponding to an outer shape of the separating cylinder 14 are provided on the lower surface of the partition wall 7 and the upper surface of the initiator collar 13, and the upper and lower ends of the separating cylinder 14 are fitted into the respective hole portions. By arranging the separating cylinder 14 in this manner, a flame of the transfer charge generated in one of the transfer charge combustion chambers never directly burns the transfer charge in the other transfer charge accommodating chamber, and the gas generating agents stored in two combustion chambers are respectively ignited and burnt by the flame generated by the combustion of the transfer charges in the respective sections. Namely, in general, when the transfer charge burns in the separating cylinder 14 (that is, in the second transfer charge accommodating chamber), a pressure of the gas generated by the combustion expands the separating cylinder in the radial direction, however, by arranging the separating cylinder, the upper and lower end portions of the separating cylinder are securely supported to peripheral walls of the hole portions where the respective portions are fitted, so that, in comparison with the case of simply interposing the separating cylinder between the partition wall and the initiator collar, leaking of the combustion gas and the flame of the transfer charge can be prevented unfailingly.

Further, a common coolant/filter 22 for purifying and cooling the combustion gas generated due to the combustion of the gas generating agents (9a, 9b) is disposed in the housing 3, and an inner peripheral surface in the diffuser shell 1 side thereof is covered with a short-pass preventing member 23 so that the combustion gas does not pass between an end surface of the coolant/filter 22 and an inner surface 28 of the ceiling portion of the diffuser shell 1. An outer layer 24 which prevents the filter 22 from expanding outwardly due to passing of the combustion gas or the like is arranged on the outside of the coolant/filter 22. The outer layer 24 is, for example, formed by using a layered wire mesh body, and in addition, may be formed by using a porous cylindrical member having a plurality of through holes on the peripheral wall surface or a belt-like suppressing layer obtained by forming a belt-like member with a predetermined width into an annular shape. A gap 25 is further formed on the outside of the outer layer 24 so that the combustion gas can pass through all portions of the filter 22. A gas discharge port 26 formed in the diffuser shell is closed by a seal tape 27 in order to stop ingress of the outer air. The seal tape 27 is ruptured when the gas is discharged. The seal tape 27 is to protect the gas generating agent from outer moisture, and it does not affect any adjustment of performances such as internal combustion pressure.

In the gas generator constituted in the above manner, when the first igniter 12a disposed outside the separating cylinder 14 but inside the ignition means accommodating chamber 8 is activated, the transfer charge 16a stored in the first transfer charge accommodating chamber 15a is ignited and burnt, and the flame thereof passes through the flame transferring hole 17 of the inner-cylindrical member 4 and burns the porous cylindrical first gas generating agent 9a with seven holes in the first combustion chamber 5a. Also, when the second igniter 12b surrounded by the separating cylinder 14 is activated simultaneously with or subsequently to the first igniter 12a, the transfer charge 16b stored in the second transfer charge accommodating chamber 15b is ignited and burnt, and the flame ignites and burns the cylindrical second gas generating agent 9b with a single hole in the second combustion chamber 5b. As a result, the ignition timings of the two igniters (12a, 12b) can be adjusted. Namely, the output behavior (operation performance) of the gas generator can be optionally adjusted by activating the second igniter after activation of the first igniter or by activating the first igniter and the second igniter simultaneously. And therefore, under various kinds of circumstances such as a speed of a vehicle and an ambient temperature at a time of collision, development of an air bag can be most suitable when it is applied an air bag apparatus mentioned below. Particularly, in the gas generator illustrated in this drawing, the respective combustion chambers (5a, 5b) stores the gas generating agents (9a, 9b) having different shapes from each other respectively. The porous cylindrical first gas generating agent 9a and the single hole cylindrical second gas generating agent 9b are stored in the first and second combustion chambers, 5a and 5b respectively. Further, the amount of the gas generating agent stored in each combustion chamber (5a, 5b) is different, and the gas generating agents (9a, 9b) at an amount of 35 g and 6 g are stored respectively in the first combustion chamber 5a and the second combustion chamber 5b. Consequently, in this gas generator, the output behavior can be adjusted more precisely. Naturally, a shape, a composition, a composition ratio, an amount, etc. of the gas generating agent may be changed to obtain the desired output behavior.

Embodiment 2

Figure 2:
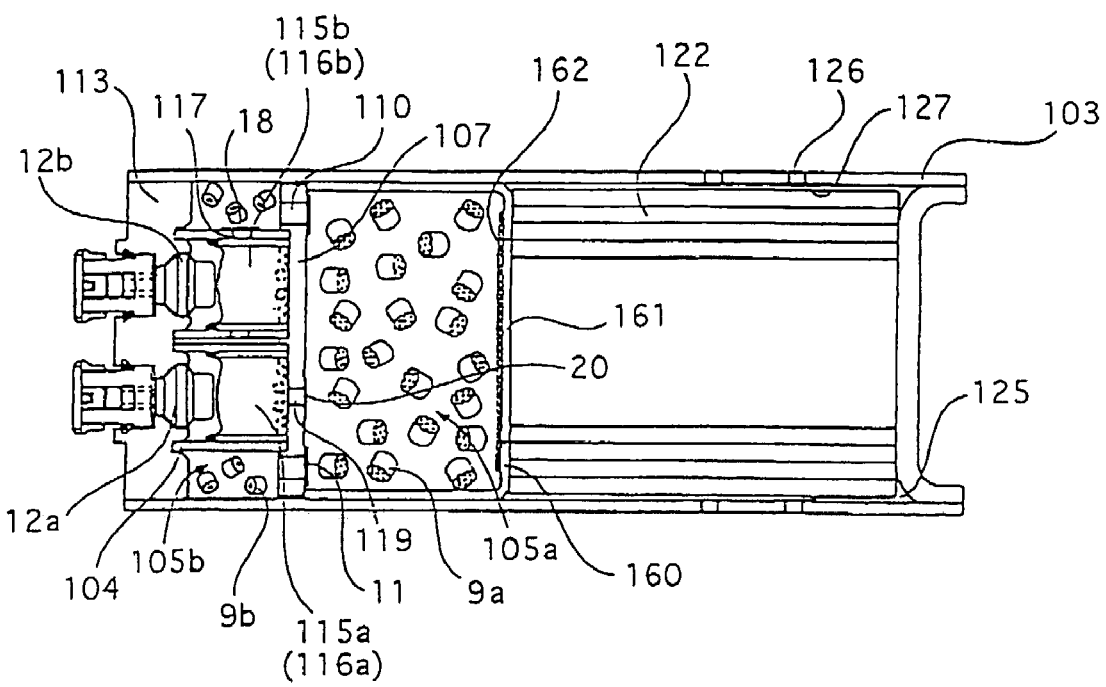
FIG. 2 is a vertical cross sectional view showing other embodiment of a gas generator of the present invention.

FIG. 2 is a vertical cross sectional view showing another embodiment of a gas generator for an air bag of the present invention. This gas generator is structured so as to be particularly suitable for being arranged on a front passenger side.

The gas generator shown in this drawing has the housing 103 formed into a cylindrical shape having an axial core length longer than an outermost diameter and having a plurality of gas discharge ports on the peripheral wall thereof, and an ignition means to be actuated on the impact, gas generating agents (9a, 9b) which are to be ignited and burnt by the ignition means and generate a combustion gas for inflating the air bag and a coolant/filter 122 for cooling and/or purifying the combustion gas generated due to the combustion of the gas generating agents. The ignition means, the gas generating agents (9a, 9b) and the coolant/filter 122 are all accommodated in the housing 103. Then, two combustion chambers (105a, 105b) provided in the housing 103 are formed as a cylindrical combustion chamber 105a and an annular combustion chamber 105b, respectively. These chambers are concentrically provided so as to be adjacent to each other to an axial direction of the housing 103, and a communicating hole 110 which allows mutual communication between the combustion chambers (105a, 105b) is provided.

The gas generator shown in the present embodiment is long in the axial direction since the housing is formed a cylindrical shape longer in the axial direction. The gas generator formed in this shape is particularly configured by combining two combustion chambers (105a, 105b) such as a cylindrical combustion chamber 105a and an annular combustion chamber 105b in the above manner, and it is a gas generator having a simple structure and easily manufactured while the output of the gas generator and the timing for increasing the output can be optionally adjusted by concentrically providing these combustion chambers so as to be adjacent to each other and allowing both the combustion chambers to communicate with each other.

Then, the ignition means comprises two or more igniters to be activated on the impact and the respective igniters (12a, 12b) are provided in one initiator collar 113 so as to be parallel to each other, which makes assembling thereof facilitated. Also, the respective igniters (12a, 12b) assembled to the one initiator collar 113 and stored in the housing are eccentric to the axis of the housing.

Further, a coolant/filter 122 in a substantially cylindrical shape is arranged in the housing 103 so as to face a housing inner peripheral surface on which a plurality of gas discharge ports 126 are formed, and a predetermined gap 125 is secured between the filter 122 and the housing inner surface. The first combustion chamber 105a is defined so as to be adjacent to a space in which the coolant/filter 122 is installed, and the ignition means including two igniters (12a, 12b) is concentrically arranged so as to be adjacent to the first combustion chamber 105a. Then, since the annular second combustion chamber 105b is defined in the radial direction of the ignition means, the first combustion chamber 105a and the second combustion chamber 105b are provided to be adjacent to each other in the axial direction of the housing 103. The different gas generating agents (9a, 9b) are respectively charged in the first and second combustion chambers, and in the gas generator shown in this drawing, the porous cylindrical first gas generating agent 9a and the single-hole cylindrical second gas generating agent 9b are stored in the first combustion chamber 105a and the second combustion chamber 105b respectively.

The above ignition means comprises the transfer charges which are to be ignited and burnt according to the activation of the igniters (12a, 12b) and that ignites the gas generating agents (105a, 105b) by the flame thereof, and the transfer charges are partitioned for the respective igniters and independently ignited and burnt at the respective igniters. A space where the transfer charge partitioned for each igniter is stored, is defined by a cylindrical member. And a first transfer charge accommodating chamber 115a where a first transfer charge 116a is stored communicates with the first combustion chamber 105a by a flame-transferring hole 119 on a partition wall 107 arranged between the ignition means and the first combustion chamber 105a, and a second transfer charge accommodating chamber 115b where a second transfer charge 116b is stored communicates with the second combustion chamber 105b by a flame-transferring hole 117 formed on the cylindrical member 104 which defines the accommodating chamber 115b.

Then, the seal tape 11 closing the through hole 110 formed on the partition wall 107 is ruptured due to combustion of the second gas generating agent 9b, with the result that the first combustion chamber 105a and the second combustion chamber 105b can be communicated with each other through the though hole 110. In the present embodiment, a seal tape made of a stainless steel which has a tensile strength of 54 kg/mm$^2$ and a thickness of 40 µm is used as the seal tape 11. Since this seal tape 11 has the predetermined tensile strength and thickness, it is not ruptured due to combustion of the first gas generating agent 9a but it is ruptured due to combustion of the second gas generating agent 9b only.

In the gas generator shown in this drawing, when the first igniter 12a is activated, the transfer charge 116a in the first transfer charge accommodating chamber 115a is ignited and burnt, the flame thereof passes through the flame-transferring hole 119 in the partition wall member 107 to ignite and burn the gas generating agent 9a in the first combustion chamber 105a, and then the combustion gas is generated. This combustion gas is purified and cooled while passing through the coolant/filter 122 and is discharged from a gas discharge port 126. On the other hand, when the second igniter 12b is actuated, the transfer charge 116b in the second transfer charge accommodating chamber 115b is ignited and burnt, the flame thereof ignites and burns the gas generating agent 9b in the second combustion chamber 105b. The combustion gas generated in the second combustion chamber 105b passes inside the first combustion chamber 105a through the through hole 110 in the partition wall 107, is purified and cooled while passing through the coolant/filter 122 and then, is discharged from the gas discharge port 126. The combustion gas generated due to combustion of the first gas generating agent and the combustion gas generated due to combustion of the second combustion gas are purified and cooled while passing through the same coolant/filter 122. Incidentally, also in the present embodiment, the gas discharge port 126 is closed by the seal tape 127. The seal tape 127 is for protecting the gas generating agent from external moisture. It is ruptured by the combustion gas generated due to combustion of the gas generating agent, which enables to discharge the combustion gas. Accordingly, this seal tape 127 does not control the combustion performance (internal combustion pressure) of the gas generating agent. And the flame-transferring ports 119 and 117 are closed by the seal tapes 20 and 18 respectively.

Further, a communicating hole 161 communicating both chambers is provided in a sectioning member 160 which defines the first combustion chamber 105b and the space where the coolant/filter 122 is installed, the combustion gas generated in the first and second combustion chambers (105a, 105b) reaches the space accommodating the coolant/filter 122 through the communicating hole 161. According to this embodiment, a communicating hole 161 has substantially the same size as an inner diameter of the coolant/filter 122. Then, a wire mesh 162 is placed over the communication hole 161 so that the gas generating agent 9a in the first combustion chamber 105a does not move into the space where the coolant/filter 122 is installed at combustion. Any kinds of wire mesh can be used for this wire mesh 162 as long as it has a mesh size well enough to stop movement of the first gas generating agent 9a at combustion and does not have a draft resistance such as to control the combustion performance.

Figure 3:
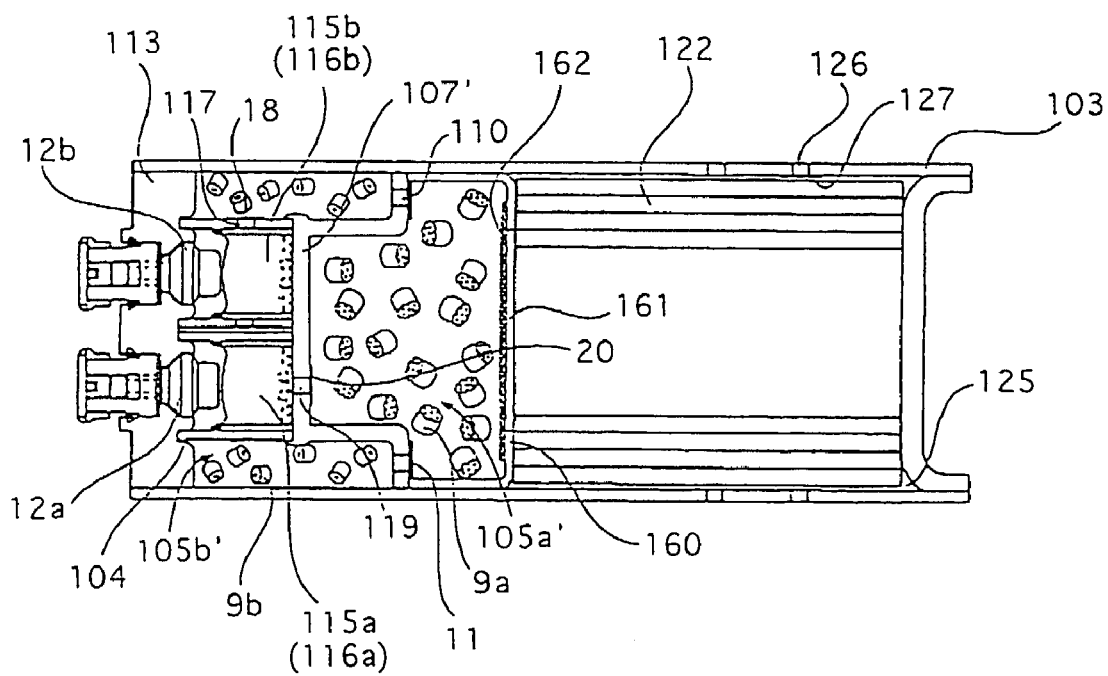
FIG. 3 is a vertical cross sectional view showing other embodiment of a gas generator of the present invention.
Figure 4:
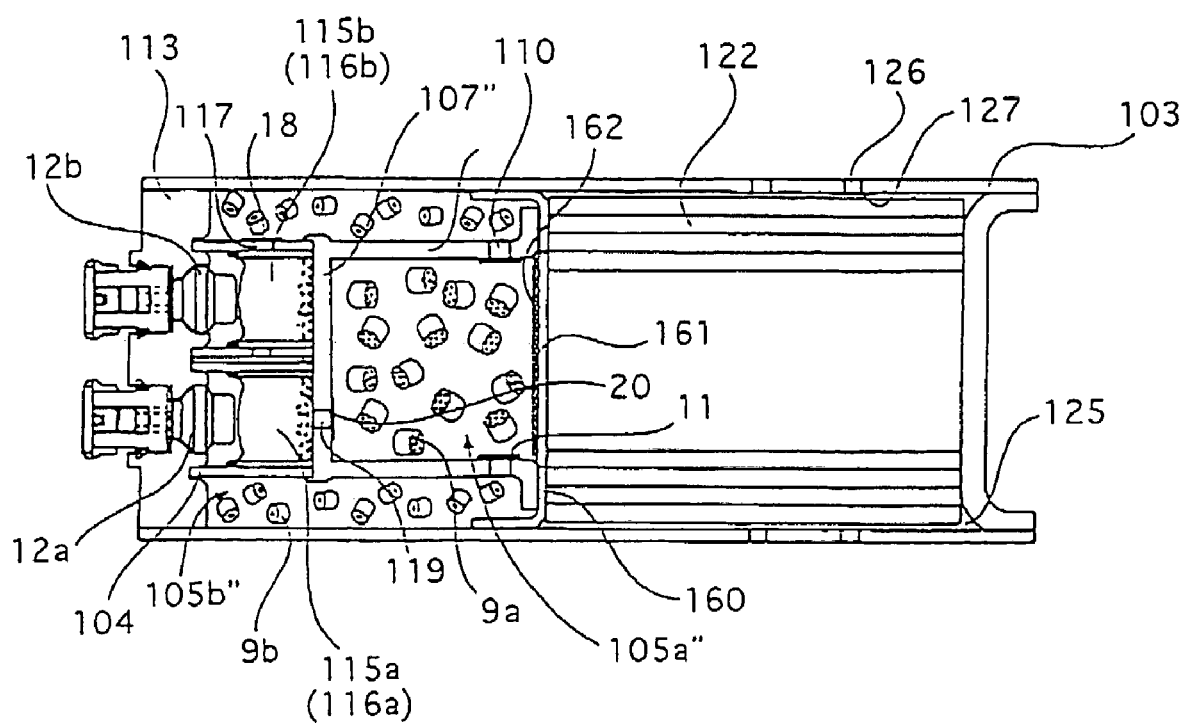
FIG. 4 is a vertical cross sectional view showing other embodiment of a gas generator of the present invention.

As mentioned above, also in the gas generator according to this embodiment, the gas generating agents (9a, 9b) stored in the respective combustion chambers (105a, 105b) are independently ignited and burnt by adjusting the activation timing of two igniters (12a, 12b), and thereby the output behavior (the operation performance) of the gas generator can be optionally adjusted. Consequently, in various circumstances such as the speed of the vehicle at a time of collision, an ambient temperature, development of an air bag can be most suitable when it is applied an air bag apparatus mentioned below. Incidentally, in relation to the embodiment shown in FIG. 2, two combustion chambers provided in the housing can be provided so as to be adjacent to each other in the axial direction and the radial direction of the housing, as shown in FIG. 3. Specifically, in the gas generator shown in FIG. 3, a partition wall 107' defining the first combustion chamber 105a', the ignition means and the second combustion chamber 105b' is bent towards the axial direction, and then a tip end of the partition wall is formed in a flange shape to abut on the inner periphery of the housing so that the second combustion chamber 105b' is expanded in the axial direction of the housing. As a result, in the gas generator shown in FIG. 3, by expanding the second combustion chamber in the axial direction, namely, expanding the second combustion chamber into the first combustion chamber side, the first combustion chamber and the second combustion chamber become adjacent to each other in the axial direction and the radial direction of the housing. Furthermore, in this embodiment, as shown in FIG. 4, when a peripheral wall is provided to extend the partition wall 107" so that the flange-shaped portion thereof abuts on the sectioning member 160, a first combustion chamber 105a" and a second combustion chamber 105b" are adjacent to each other in the radial direction of the housing and they are provided concentrically. As a result, the volume of the second combustion chamber can be made larger than that of the gas generator shown in FIG. 3. Particularly, in the gas generator shown in FIG. 3 and FIG. 4, the volume of the second combustion chamber can be made larger, which is preferable when a large amount of the second gas generating agent is used. Even the gas generator shown in FIG. 3 and FIG. 4 may be a gas generator for an air bag which is compact with a simple structure and the output's form (activation performance) of the gas generator can be optionally adjusted like the gas generator shown in FIG. 2. In the gas generator shown in FIG. 3 and FIG. 4, the same members as those in FIG. 2 are denoted by the same reference numerals, and explanation thereof is omitted.

Embodiment 3

Figure 5:
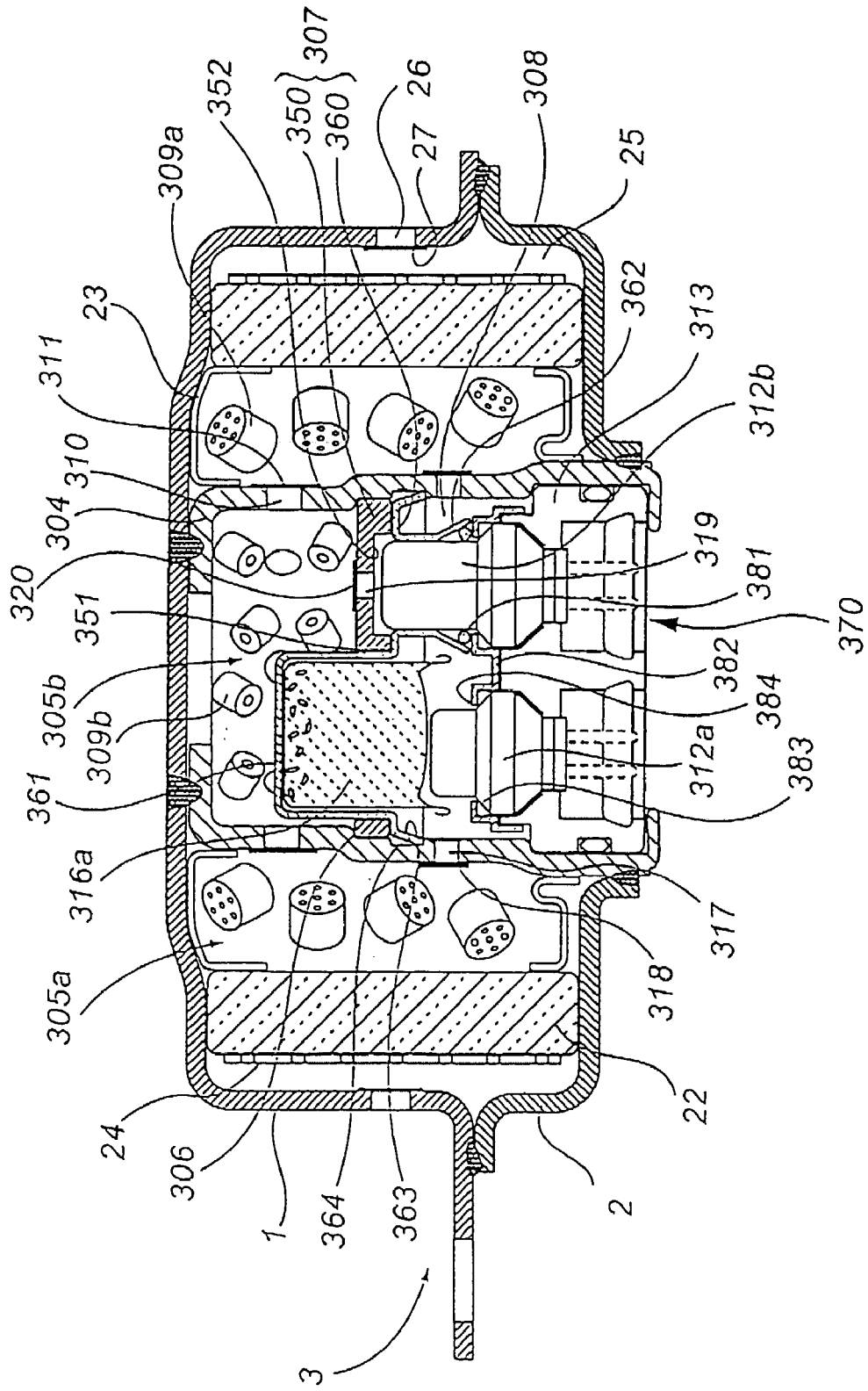
FIG. 5 is a vertical cross sectional view showing other embodiment of a gas generator of the present invention.

FIG. 5 is a vertical cross sectional view showing still another embodiment of a gas generator for an air bag of the present invention. The gas generator shown in this drawing has a particularly suitable structure for being arranged in a driver side.

The gas generator includes two combustion chambers and an ignition means accommodating chamber in the housing formed by joining the diffuser shell 1 having a gas discharge port and the closure shell 2 forming an internal accommodating space together with the diffuser shell.

A first combustion chamber 305a is configured by the housing 3 and an inner-cylindrical member 304 in a substantial cylindrical shape which is arranged in the interior of the housing. And, by arranging a partition wall 307 in a substantially disk-shape to a stepped notched portion 306 which is provided in the inner-cylindrical member 304, the interior of the inner-cylindrical member 304 is partitioned into two chambers so that a second combustion chamber 305b is formed on the diffuser shell 1 side and an ignition means accommodating chamber 370 is formed on the closure shell 2 side. Accordingly, in the gas generator, the first combustion chamber 305a and the second combustion chamber 305b are concentrically arranged in the housing 3, being adjacent to each other in the radial direction of the housing.

Gas generating agents (309a, 309b) which are to be burnt by an ignition means actuated due to the impact to generate combustion gases are stored in the first and second combustion chambers (305a, 305b), and the ignition means to be activated on the impact is stored in the ignition means accommodating chamber 370.

A through hole 310 is formed in the inner-cylindrical member 304 defining the first combustion chamber 305a and the second combustion chamber 305b, and this through hole is closed by a seal tape 311. Incidentally, the seal tape 311 is ruptured at combustion of the gas generating agent 309b and thereby the both combustion chambers communicate with each other via the through hole 310. This seal tape 311 is adjusted in its material and thickness so as to be ruptured only when the gas generating agent 309b in the second combustion chamber 305b is burnt. In the present embodiment, a seal tape made of stainless steel with a tensile strength of 54 kg/mm$^2$ and a thickness of 40 μm is used. The through hole 310 is larger in opening area than the gas discharge port 26, and it does not have a function for controlling the internal pressure in the combustion chamber 305b.

Figure 6:
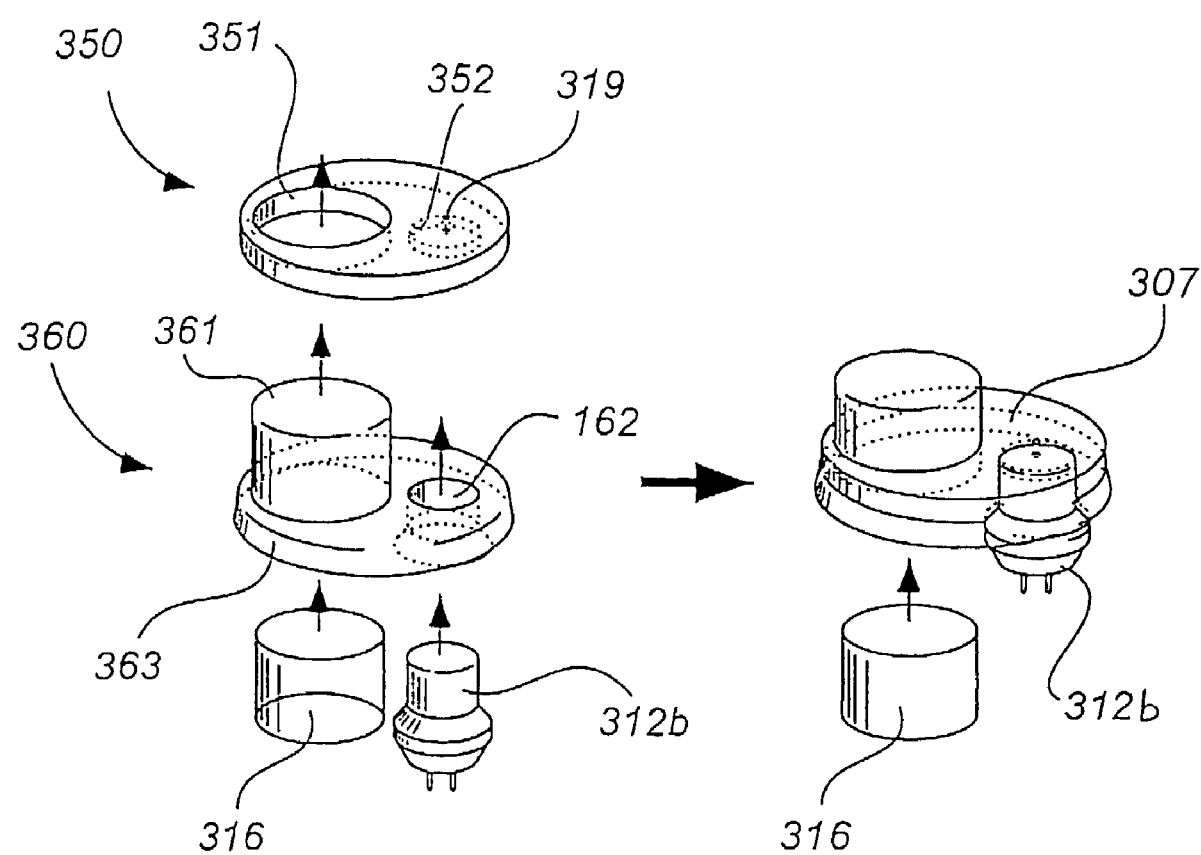
FIG. 6 is an exploded perspective view showing a partition wall in FIG. 5.

The ignition means comprises the ignition means accommodating chamber storing an igniter and a transfer charge. The ignition means accommodating chamber 370 is formed to surround the first igniter 312a and the second igniter 312b with an initiator collar 313, an inner-cylindrical member 304 and a partition wall 307 in a substantially disk-shape. Incidentally, the partition wall 307 in a substantially disk-shape is, as shown in an exploded perspective view in FIG. 6, constituted by a sectioning circular member 350 engaged with the stepped notch portion 306 of the inner-cylindrical member 304 and a seal cup member 360 engaged with the sectioning circular member 350.

Two electric ignition type igniters 312a, 312b are provided in one initiator collar 313 in parallel to each other, having their head portions exposed. By providing the igniters 312a, 312b in the one initiator collar 313 in this manner, the two igniters become a single member, being fixed to the initiator collar, which facilities assembling to the gas generator. Particularly, in the gas generator shown in FIG. 5, by forming the initiator collar 313 in a size capable of being inserted into the inner-cylindrical member 4, the initiator collar 313 with two igniters 312a and 312b is inserted into the inner cylinder 304, and then two igniters can be easily and securely fixed by crimping the lower end of the inner-cylindrical member 304 to fix the initiator collar. Also, when the two igniters are arranged in the initiator collar 313, the directions of the respective igniters are controlled easily.

The sectioning circular member 350 constituting a partition wall 307 is formed in a substantially disk-shape, and has an opening portion 351 into which a transfer charge accommodating chamber 361 of a seal cup member 360 is fitted, a circular-hollow portion 352 obtained by hollowing a bottom surface in a circular shape to receive the upper portion of an igniter 312b, and a second flame-transferring hole 319 piercing through a substantially center of the circular hollow portion 352.

The seal cup member 360 has a cylindrical transfer charge accommodating chamber 361 which fits into the opening portion 351 of the sectioning circular member 350 and protrudes into the second combustion chamber 305b, and a cylindrical igniter receiving port 362 formed at a position facing the circular hollow portion 352 of the sectioning circular member 350 and extending towards the opposite direction to the transfer charge accommodating portion 361.

A transfer charge 316a is stored inside the transfer charge accommodating chamber 361, and a second igniter 312b is fitted into the igniter receiving port 362. The sectioning circular member 350 and the seal cup member 360 are engaged with each other by fitting the transfer charge accommodating chamber 361 of the seal cup member 360 into the opening portion 351 of the sectioning circular member 350, and the upper portion of the second igniter 312b fitted into the igniter receiving port 362 protrudes into the circular hollow portion 352 of the sectioning circular member 350.

The partition wall 307 constituted by the sectioning circular member 350 and the seal cup member 360 is, as shown in FIG. 5, engaged with the stepped notch portion 306 formed on the inner peripheral surface of the inner-cylindrical member 304. That is, the peripheral edge of the sectioning circular member 350 is supported to the stepped notch portion 306, and the seal cup member 360 is supported in contact with the sectioning circular member 350.

Further, the peripheral edge of the seal cup member 360 is formed by being bent in the same direction as that of the igniter receiving port 362, and a bent portion 363 is fitted into a groove 364 provided on the inner peripheral surface of the inner-cylindrical member 304. Accordingly, the sectioning circular member 350 is supported by the seal cup member 360 and its movement in the axial direction of the housing 3 is blocked. Further, the partition wall 307 (i.e. the seal cup member 360) and the inner-cylindrical member 304 are engaged with each other with no gap by fitting the bent portion 363 in the peripheral edge of the seal cup member 360 into the groove 364 on the inner peripheral surface of the inner-cylindrical member 304.

Accordingly, in the inner-cylindrical member 304, the ignition means accommodating chamber 308 provided in the closure shell 2 side and the second combustion chamber 305b provided in the diffuser shell 1 side are securely partitioned by an ignition means sealing structure comprising a combination of the seal cup member 360 and the groove 364.

The igniter receiving port 362 formed in the seal cup member 360 has a skirt portion spreading like a fan, and an O-ring 381 is arranged in the inside thereof, in other words, between the port and the second igniter 312b stored in the receiving port 362, and thereby sealing between the receiving port 362 and the second igniter 312b.

And since the O-ring 381 is also press-contacted to an igniter fixing member 382 which fixes two igniters 312a and 312b to the single initiator collar, the second igniter 312b is arranged in a space defined by the circular hollow portion 352 of the sectioning circular member, the igniter receiving port 362 of the seal cup member, the O-ring 381 and the igniter fixing member 382.

Therefore, the two igniters 312a and 312b arranged in the initiator collar 313 are fixed to the igniter fixing member 382 fitted on the initiator collar 313. By using the above igniter fixing member 382, two igniters 312a and 312b can be easily assembled to the initiator collar 313. In the gas generator shown in this embodiment, the first igniter 312a and the second igniter 312b are formed in different sizes, and the outputs thereof are different, however, the igniters having the same output may be used.

The seal tape 320 closing the second flame-transferring hole 319 formed in the circular hollow portion 352 of the sectioning circular member 350 is ruptured by activation of the second igniter 312b and the space sectioned in this manner communicates with the second combustion chamber 305b. Then, the first igniter 312a and the second igniter 312b are securely separated from each other by a seal structure (hereinafter, referred to as "igniter seal structure") comprising a skirt portion of the igniter receiving port 362, the O-ring 381 and the igniter fixing member 382. Accordingly, flame generated due to actuation of either one of the igniters never directly flows into the space where the other igniter is stored.

A coolant/filter 22 for purifying and cooling the combustion gas generated due to the combustion of the gas generating agents (309a, 309b) is disposed in the housing 3, and an inner peripheral surface thereof in the diffuser shell 1 side is covered with a short pass preventing member 23 so that the combustion gas does not pass between an end surface of the coolant/filter 22 and the inner surface of a ceiling portion of the diffuser shell 1. An outer layer 24 for suppressing the filter 22 from expanding outwardly due to passing of the combustion gas or the like is arranged on the outside of the coolant/filter 22. The outer layer 24 is, for example, formed by using a layered wire mesh body, and in addition, may be formed by using a porous cylindrical member having a plurality of through holes on a peripheral wall surface or a belt-like suppressing layer obtained by forming a belt-like member with a predetermined width into an annular shape. A gap 25 is further formed on the outside of the outer layer 24 so that the combustion gas can pass through all portions of the filter 22.

In actuation of the gas generator shown in this embodiment, flame generated by actuation of the first igniter 312a ignites and burns the first transfer charge 316a disposed above the first igniter. The flame generated by combustion of the first transfer charge 316a does not enter in the space where the second igniter 312b is stored due to the above igniter seal structure and it does not enter in the second combustion chamber 305b due to an ignition means seal structure comprising the bent portion 363 of the seal cup member 360 and the groove 364 of the inner-cylindrical member 304. Accordingly, the flame generated due to combustion of this first transfer charge 316a flows only in the first combustion chamber 305a through the first flame-transferring hole 317 formed in the peripheral wall of the inner-cylindrical member 304 to ignite and burn the first gas generating agent 309a and generate combustion gas.

Also, the flame generated due to actuation of the second igniter 312b flows only in the second combustion chamber 305b through the second flame-transferring hole 319 formed in the circular hollow portion 352 of the sectioning circular member 350 exclusively to ignite and burn the second gas generating agent 309b and generate combustion gas. Particularly, in the gas generator in this embodiment, the second transfer charge is not arranged and the second gas generating agent 309b is ignited and burnt directly by the flame generated due to actuation of the second igniter 312b.

And, the combustion gas generated due to the combustion of these first gas generating agent 309a and second gas generating agent 309b is purified and cooled while passing through the common coolant/filter 22, and it passes through the gap 25 to be discharged from the gas discharge port 26. The seal tapes 318 and 320 closing the first and second flame-transferring holes are ruptured when the flames of the igniters and the combustion gas of the transfer charges pass through the holes, and the seal tape 27 closing the gas discharge port 26 is ruptured when the combustion gas passes.

Embodiment 4

Figure 7:
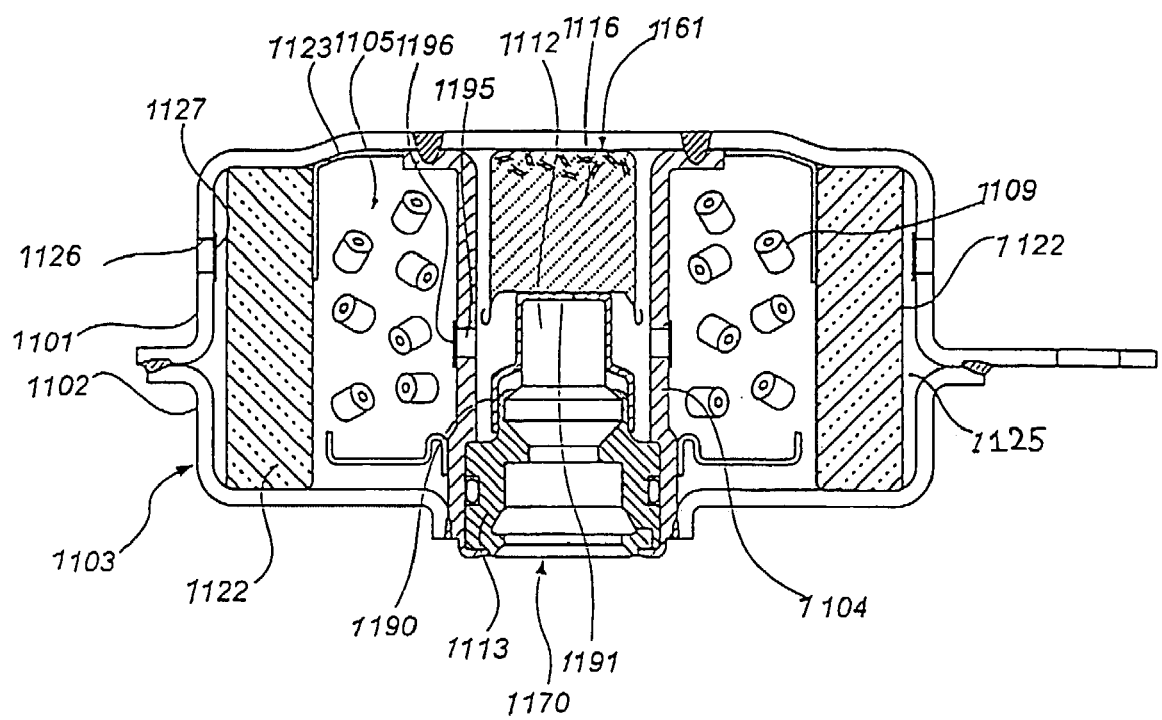
FIG. 7 is a vertical cross sectional view showing one embodiment of a gas generator of the present invention.
Figure 8:
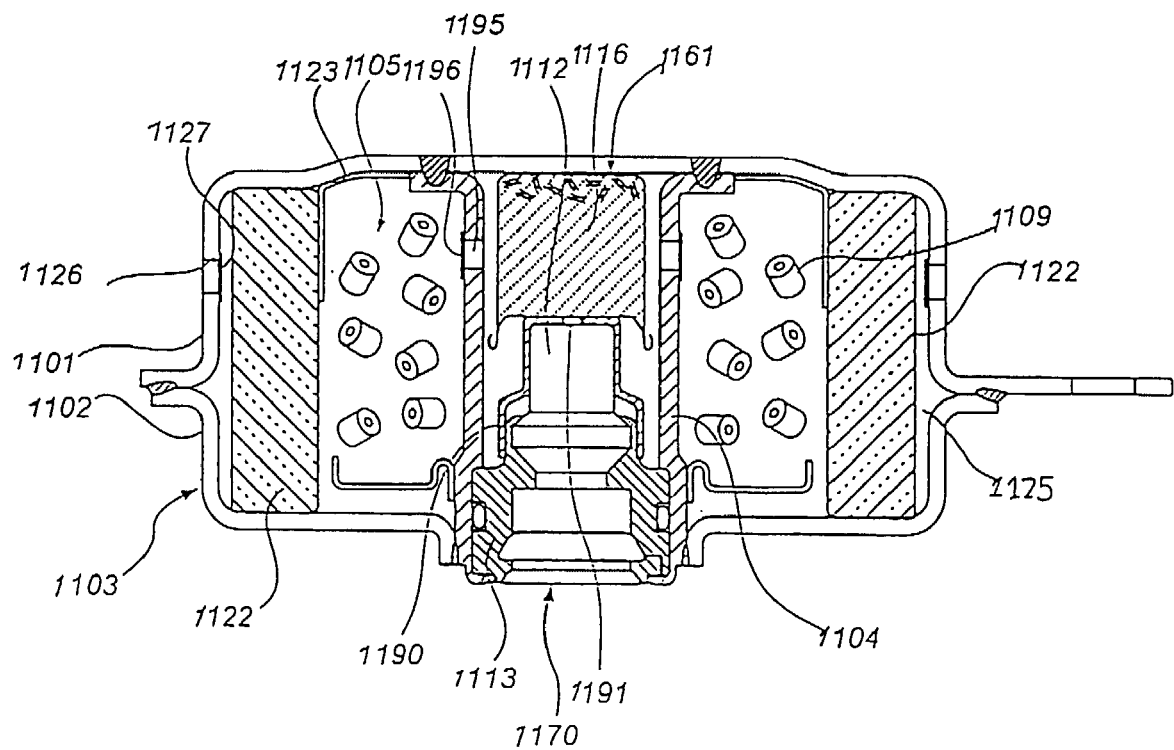
FIG. 8 is a vertical cross sectional view showing other embodiment of a gas generator of the present invention.

FIGS. 7 and 8 are vertical cross sectional views showing gas generators for an air bag of the present invention in embodiments. Incidentally, FIG. 8 shows the same embodiment as that shown in FIG. 7 except for arrangement of flame-transferring holes. The gas generators shown in these embodiments have structures particularly suitable for being arranged in a driver side. The gas generators comprise a housing 1103 which is formed by joining a diffuser shell 1101 with gas discharge ports and a closure shell 1102 forming an inner accommodating space together with the diffuser shell, and a combustion chamber and an ignition means accommodating chamber arranged in the housing 1103.

A combustion chamber 1105 is formed by the housing 1103 and an inner-cylindrical member 1104 which is formed substantially cylindrically and arranged in the housing. A gas generating agent 1109 which is to be burnt for generating a combustion gas by an ignition means actuated by the impact is stored inside this combustion chamber 1105, and the ignition means to be actuated by the impact is stored in an ignition means accommodating chamber 1170.

The ignition means comprises an igniter and a transfer charge provided in the ignition means accommodating chamber. The ignition means accommodating chamber 1170 is defined by arranging an initiator collar 1113 and the inner-cylindrical member 1104 to surround an igniter 1112.

Figure 9:
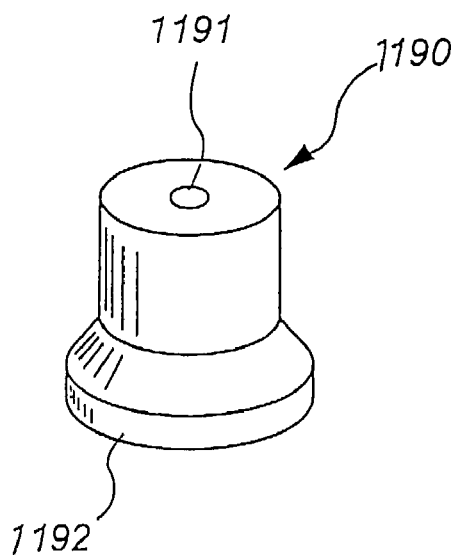
FIG. 9 is a perspective view showing a cup.

And, a transfer charge accommodating chamber 1161 is arranged opposite to the igniter 1112 in the axial direction, being separated from the igniter, and a transfer charge 1116 filled in a cylindrical metallic transfer-charge container such as aluminum is stored in the chamber 1161. A cup 1190 (referred to FIG. 9) having one or more holes 1191 on the ceiling thereof covers the igniter 1112 from the side opposite to the transfer charge 1116. This cup 1190 is preferably made of metal and it can be fixed to the initiator collar 1113 by crimping or welding a skirt portion 1192 thereof. The ceiling of the cup 1190 and the transfer charge 1116 may come into contact with each other or may have a gap therebetween.

Then, a flame-transferring hole 1195 communicating with the combustion chamber 1105 is formed at a position where it is not exactly opposite to the transfer charge 1116 in the radial direction, and it is closed by a seal tape 1196. Incidentally, in the embodiment shown in FIG. 8, the flame-transferring hole 1195 communicating with the combustion chamber 1105 is formed at a position where it is exactly opposite to the transfer charge 1161, and it is closed by the seal tape 1196.

An area ratio (A/B) of an area (A) of the hole 1191 of the cup 1190 and an area (B) of the transfer charge opposite to the hole 1191 is set to 0.006.

An electric ignition type igniter 1112 is provided in the initiator collar 1113, exposing the head portion thereof. By providing the igniter 1112 to the initiator collar 1113 in this manner, the igniter 1112 is fixed to the initiator collar 1113 to form a single member, thereby facilitating the assembling to the gas generator.

Also, a coolant/filter 1122 for purifying and cooling the combustion gas generated by the combustion of the gas generating agent 1109 is disposed in the housing 1103, and an inner peripheral surface in the diffuser shell 1101 side thereof is covered with a short pass preventing member 1123 so that the combustion gas does not pass between the end surface of the coolant/filter 1122 and a ceiling-portion inner surface of the diffuser shell 1101. A gap 1125 is formed between the coolant/filter 1122 and an inner wall of the housing 1103 so that the combustion gas can pass through all portions of the filter 1122.

In the embodiments shown in FIG. 7 and FIG. 8 mentioned above, the flame generated due to ignition of the igniter 1112 advances straightly with a narrow width because of influence of the hole 1191 of the cup 1190 to reach the depths of the transfer charge accommodating chamber 1161 and instantaneously burn the transfer charge completely. The flame thus generated ruptures the seal tape 1196 to enter into the combustion chamber 1105 from the flame-transferring hole 1195 to burn the gas generating agent 1109 and generate a gas. Accordingly, by using the cup 1190, the combustion performance from the ignition of the igniter 1112 to the gas generation due to the combustion of the transfer charge 1116 and the gas generating agent 1109 can be made smoothly. Then, the gas generated in the combustion chamber 1105 is discharged from a plurality of gas discharge ports 1126 via the coolant/filter 1122 and the gap 1125.

Embodiment 5

Figure 10:
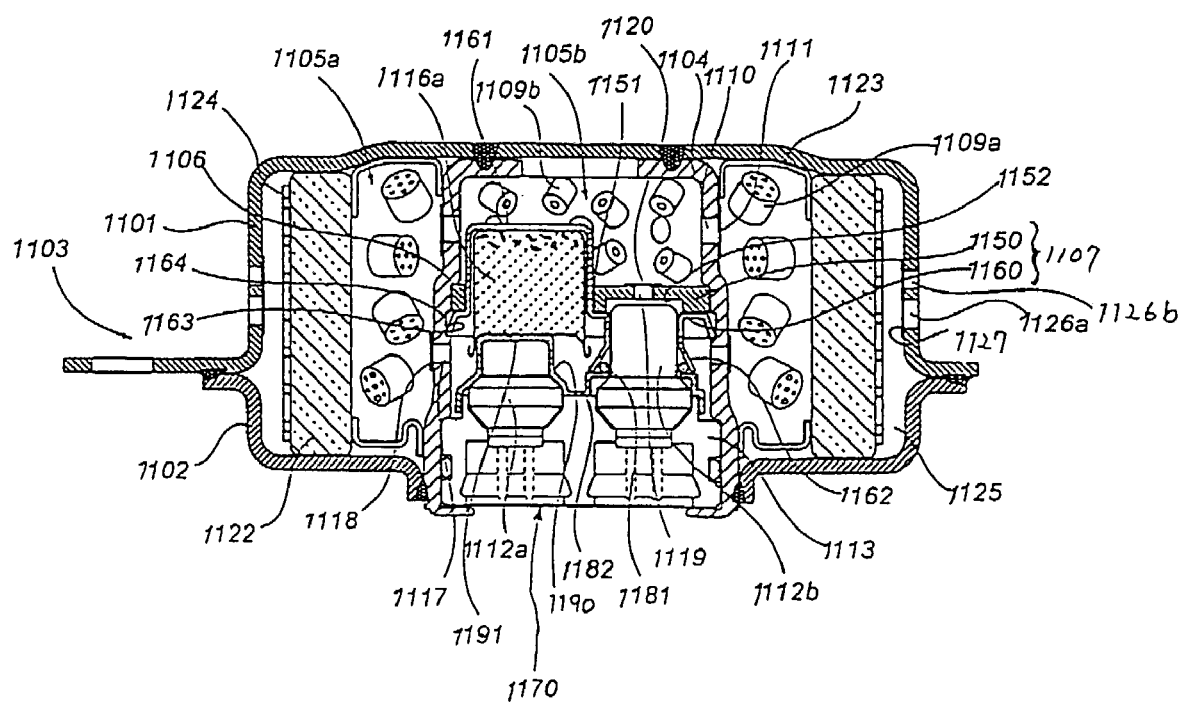
FIG. 10 is a vertical cross sectional view showing other embodiment of a gas generator of the present invention.

FIG. 10 is a vertical cross sectional view showing a gas generator for an air bag of the present invention in one embodiment. Incidentally, the gas generator shown in this embodiment has a structure particularly suitable for being arranged in a driver side.

The gas generator comprising a housing 1103 which is formed by joining a diffuser shell 1101 with a gas discharge port and a closure shell 1102 forming an inner accommodating space together with the diffuser shell, and two combustion chambers and an ignition means accommodating chamber arranged in the housing 1103.

A first combustion chamber 1105a is formed by the housing 1103 and a substantially cylindrical inner-cylindrical member 1104 arranged inside the housing. Also, a substantially disk-shaped partition wall 1107 is arranged on a stepped notch portion 1106 provided inside the inner-cylindrical member 1104, and two chambers are further defined in the inner-cylindrical member 1104 to form a second combustion chamber 1105b on the diffuser shell 1101 side and an ignition means accommodating chamber 1170 on the closure shell 1102 side. Thus, in this gas generator, the first combustion chamber 1105a and the second combustion chamber 1105b are concentrically provided in the housing 1103 and they are adjacent to each other in the radial direction.

Gas generating agents (1109a, 1109b) which is to be burnt for generating a combustion gas by an ignition means actuated upon the impact are stored in the first and second combustion chambers 1105a and 1105b, and the ignition means to be actuated upon the impact is stored in the ignition means accommodating chamber 1170.

A through hole 1110 is provided in the inner-cylindrical member 1104 defining the first combustion chamber 1105a and the second combustion chamber 1105b, and it is closed by a seal tape 1111. Incidentally, when this seal tape 1111 is ruptured due to combustion of the gas generating agent, both combustion chambers are communicated with each other via the through hole 1110. This seal tape 1111 is adjusted in its material and thickness so that it is ruptured only when the gas generating agent 1109b in the second combustion chamber 1105b is burnt. In the present embodiment, a seal tape made of stainless steel with a thickness of 40 µm is used. The through hole 1110 has an opening area larger than that of the gas discharge port 1126b, and it does not have a function for controlling an internal pressure in the combustion chamber 1105b.

An ignition means comprises an igniter and a transfer charge arranged in an ignition means accommodating chamber. An ignition means accommodating chamber 1170 is defined by arranging an initiator collar 1113, an inner-cylindrical member 1104 and a substantially disk-shaped partition wall 1107a to surround a first igniter 1112a and a second igniter 1112b. Incidentally, the substantially disk-shaped partition wall 1107 is, as shown in an exploded perspective view of FIG. 11, comprises a sectioning circular member 1150 engaged with a stepped notch portion 1106 of the inner-cylindrical member 1104, and a seal cup member 1160 engaged with the sectioning circular member 1150.

A transfer charge accommodating chamber 1161 is arranged exactly opposite to the first igniter 1112a in the axial direction on the first igniter 1112a side, being separated from the first igniter. And a transfer charge 1116a filled in a metallic cylindrical transfer-charge container 1116 such as aluminum or the like is stored in the transfer charge accommodating chamber 1161. A cup 1190 (referred to FIG. 9) having one or more holes 1191 on the ceiling thereof covers the first igniter 1112a from the side opposite to the transfer charge 1116a. This cup 1190 is preferably made of metal, and it can be fixed to the initiator collar 1113 by crimping or welding its skirt portion 1192. The ceiling of the cup 1190 and the transfer charge 1116a may be in contact with each other or they may have a gap therebetween. And, a first flame-transferring hole 1117 communicating with the first combustion chamber 1105a is formed at a position where it is not exactly opposite to the transfer charge 1161a in the radial direction, and it is closed by a seal tape 1118.

Figure 11:
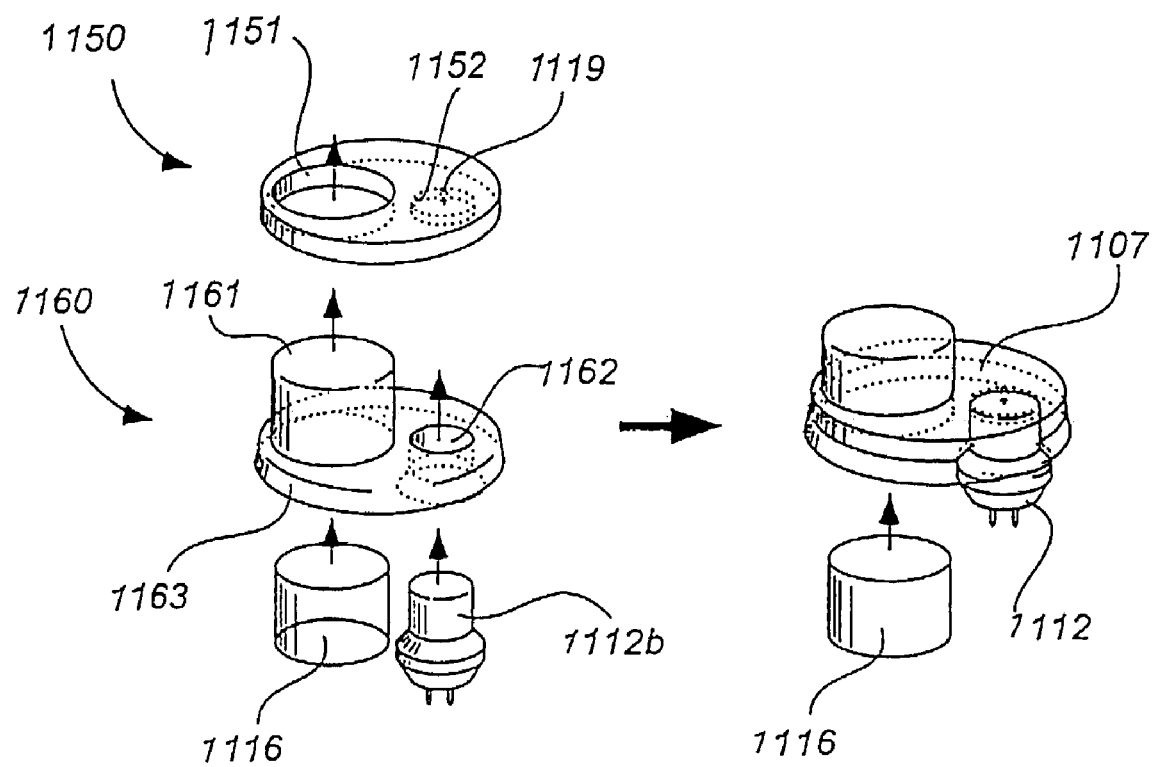
FIG. 11 is an exploded perspective view showing a partition wall.

An area ratio (A/B) of an area (A) of the hole 1191 of the cup 1190 and an area (B) of the transfer charge 1116a (approximating to the area of the opening portion of the transfer charge container 1116 shown in FIG. 11) is set to 0.006.

Two electric ignition type igniters 1112a and 1112b are provided in one initiator collar 1113 in parallel with each other, exposing the head portions thereof. By providing the igniters 1112a and 1112b in the one initiator collar 1113 in this manner, the two igniters are fixed to the initiator collar 1113 to form a single member, thereby facilitating assembling to the gas generator. Particularly, in the gas generator shown in FIG. 10, since the initiator collar 1113 is formed in a size capable of being inserted into the inner-cylindrical member 1104, the initiator collar 1113 with two igniters 1112a and 1112b is inserted into the inner cylinder 1104, and then the igniters can be easily and securely fixed by crimping the lower end of the inner-cylindrical member 1104 so as to fix the initiator collar. Also, when the two igniters are arranged in the initiator collar 1113, the directions of the respective igniters are controlled easily.

The sectioning circular member 1150 constituting a partition wall 1107 is formed in a substantially disk-shape, and has an opening portion 1151 into which a transfer charge accommodating chamber 1161 of a seal cup member 360 is fitted, a circular hollow portion 1152 obtained by hollowing the bottom surface in a circular shape to receive the upper portion of an igniter 1112b, and a second flame-transferring hole 1119 piercing through a substantially center of the circular hollow portion 1152.

The seal cup member 1160 has a cylindrical transfer charge accommodating chamber 1161 which fits into the opening portion 1151 of the sectioning circular member 1150 and protrudes into the second combustion chamber 1105b, and a cylindrical igniter receiving port 1162 formed at a position facing the circular hollow portion 1152 of the sectioning circular member 1150 and extending towards the opposite direction to the transfer charge accommodating portion 1161.

A transfer charge 1116a is stored inside the transfer charge accommodating portion 1161, and a second igniter 1112b is inserted to the igniter receiving port 1162. The sectioning circular member 1150 and the seal cup member 1160 are engaged with each other by fitting the transfer charge accommodating portion 1161 of the seal cup member 1160 into the opening portion 1151 of the sectioning circular member 1150, and an upper portion of the second igniter 1112b fitted into the igniter receiving port 1162 exposes into the circular hollow portion 1152 of the sectioning circular member 1150.

The partition wall 1107 constituted by the sectioning circular member 1150 and the seal cup member 1160 is, as shown in FIG. 10, engaged with the stepped notch portion 1106 formed in the inner peripheral surface of the inner-cylindrical member 1104. That is, the peripheral edge of the sectioning circular member 1150 is supported by the stepped notch portion 1106, and the seal cup member 1160 is supported in contact with the sectioning circular member 1150. Further, the peripheral edge of the seal cup member 1160 is formed by being bent in the same direction as that of the igniter receiving port 1162, and a bent portion 1163 is fitted into a groove 1164 provided on the inner peripheral surface of the inner-cylindrical member 1104. Accordingly, the sectioning circular member 1150 is supported by the seal cup member 1160, and movement thereof in the radial direction of the housing 1103 is blocked.

Further, the partition wall 1107 (i.e. the seal cup member 1160) and the inner-cylindrical member 1104 are engaged with each other with no gap by fitting the bent portion 1163 in the peripheral edge of the seal cup member 1160 into the groove 1164 on the inner peripheral surface of the inner-cylindrical member 1104. Accordingly, in the inner-cylindrical member 1104, the ignition means accommodating chamber 1108 provided in the closure shell side 1102 and the second combustion chamber 1105b provided in the diffuser shell side 1101 are securely partitioned by an ignition means sealing structure comprising a combination of the seal cup member 1160 and the groove 1164.

The igniter receiving port 1162 formed in the seal cup member 1160 has a skirt portion spreading like a fan, and an O-ring 1181 is arranged in the inside thereof, in other words, between the port and the second igniter 1112b stored in the receiving port 1162, and thereby sealing between the receiving port 1162 and the second igniter 1112b.

And since the O-ring 1181 is also press-contacted to an igniter fixing member 1182 which fixes two igniters 1112a and 1112b to the single initiator collar, the second igniter 1112b is arranged in a space defined by the circular hollow portion 1152 of the sectioning circular member, the igniter receiving port 1162 of the seal cup member, the O-ring 1181 and the igniter fixing member 1182. Incidentally, in this embodiment, an ignition cup 1190 and the igniter fixing member 1182 are integrally formed to be furnished with both functions, however, the ignition cup 1190 and the igniter fixing member 1182 may be formed independently.

Therefore, the two igniters 1112a and 1112b arranged in the initiator collar 1113 are fixed to the igniter fixing member 1182 (and the ignition cup 1190) fitted on the initiator collar 1113. By using the above igniter fixing member 1182 (and the ignition cup 1190), two igniters 1112a and 1112b can be easily assembled to the initiator collar 1113. In the gas generator shown in this embodiment, the first igniter 1112a and the second igniter 1112b are formed in different sizes, and the outputs thereof are different, however, the igniters having the same output may be used.

The seal tape 1120 closing the second flame-transferring hole 1119 formed in the circular hollow portion 1152 of the sectioning circular member 1150 is ruptured by activation of the second igniter 1112b and the space sectioned in this manner communicates with the second combustion chamber 1105b. Then, the first igniter 1112a and the second igniter 1112b are securely separated from each other by a seal structure (hereinafter, referred to as "igniter seal structure") comprising a skirt portion of the igniter receiving port 1162, the O-ring 1181 and the igniter fixing member 1182. Accordingly, flame generated due to actuation of either one of the igniters never directly flows into the space where the other igniter is stored.

In the gas generator shown in FIG. 10, an opening diameter and/or an opening area of a plurality of gas discharge ports (1126a, 1126b) formed in the housing 1103 are controlled to have two kinds or more. Consequently, in this gas generator for an air bag, a difference between the maximum internal pressures of the housing at activation of the respective ignition means can be minimized, the internal pressure at the time of activation of the gas generator can be equalized, and thereby the combustion performance of the gas generator can be stabilized. In the gas generator in this embodiment, also, the opening area of the gas discharge port are constant and the thickness of the sealing mean such as the seal tape 1127 is changed to adjust the rupturing pressure, and thereby, a difference between the maximum internal pressures of the housing at activation of the respective ignition means can be suppressed. Further, it is naturally possible to control the opening diameter and/or opening area of the gas discharge port as well as the thickness of the sealing means at the same time.

A coolant/filter 1122 for purifying and cooling the combustion gas generated due to the combustion of the gas generating agents (1109a, 1109b) is disposed in the housing 1103, and an inner peripheral surface thereof in the diffuser shell 1101 side is covered with a short pass preventing member 1123 so that the combustion gas does not pass between an end surface of the coolant/filter 1122 and the inner surface of a ceiling portion of the diffuser shell 1101.

An outer layer 1124 for suppressing the filter 1122 from expanding outwardly due to passing of the combustion gas or the like is arranged on the outside of the coolant/filter 1122. The outer layer 1124 is, for example, formed by using a layered wire mesh body, and in addition, may be formed by using a porous cylindrical member having a plurality of through holes on a peripheral wall surface or a belt-like suppressing layer obtained by forming a belt-like member with a predetermined width into an annular shape. A gap 1125 is further formed on the outside of the outer layer 1124 so that the combustion gas can pass through all portions of the filter 1122.

In the above embodiment, the flame generated due to ignition of the igniter 1112a advances straightly with a narrow width because of influence of the hole 1191 of the cup 1190 to reach the depths of the transfer charge accommodating chamber 1161 and instantaneously burn the transfer charge 1116a completely. The flame thus generated ruptures the seal tape 1118 to enter into the combustion chamber 1105a from the flame-transferring hole 1117 to burn the gas generating agent 1109a and generate a gas. Accordingly, by using the cup 1190, the combustion performance from the ignition of the igniter 1112a to the gas generation due to the combustion of the transfer charge 1116a and the gas generating agent 1109a can be made smoothly. Also, a flame generated by ignition of the second igniter 1112b ruptures the seal tape 1120 and then enters into the second combustion chamber 1105b through the second flame-transferring hole 1119 to burn the gas generating agent 1109b and generate a gas. The gas thus generated ruptures the seal tape 1111, and enters into the first combustion chamber through the through hole 1110. And the gases generated in the first combustion chamber 1105a and the second combustion chamber 1105b pass through the coolant/filter 1112 and the gap 1125 to be discharged from the a plurality of the gas discharge ports.

In the present invention, as means which functions in the same manner as the embodiments shown in FIGS. 7, 8 and 10, a method of making the igniter 1112 (1112a) smaller (for example, the igniter is made slim regarding its front view configuration and it is made small regarding its plane view configuration) can be employed. Besides, a method in which the igniter 1112 (1112a) is covered with a plastic covering member and a hole is provided at a portion of the cover member corresponding to the flame discharge portion of the top surface of the igniter 1112 (1112a) or a method in which the corresponding portion of the cover member is cut, it is provided with a squeeze, it is made thin or the like to be made easily breakable can be employed.

Embodiment 6

Figure 12:
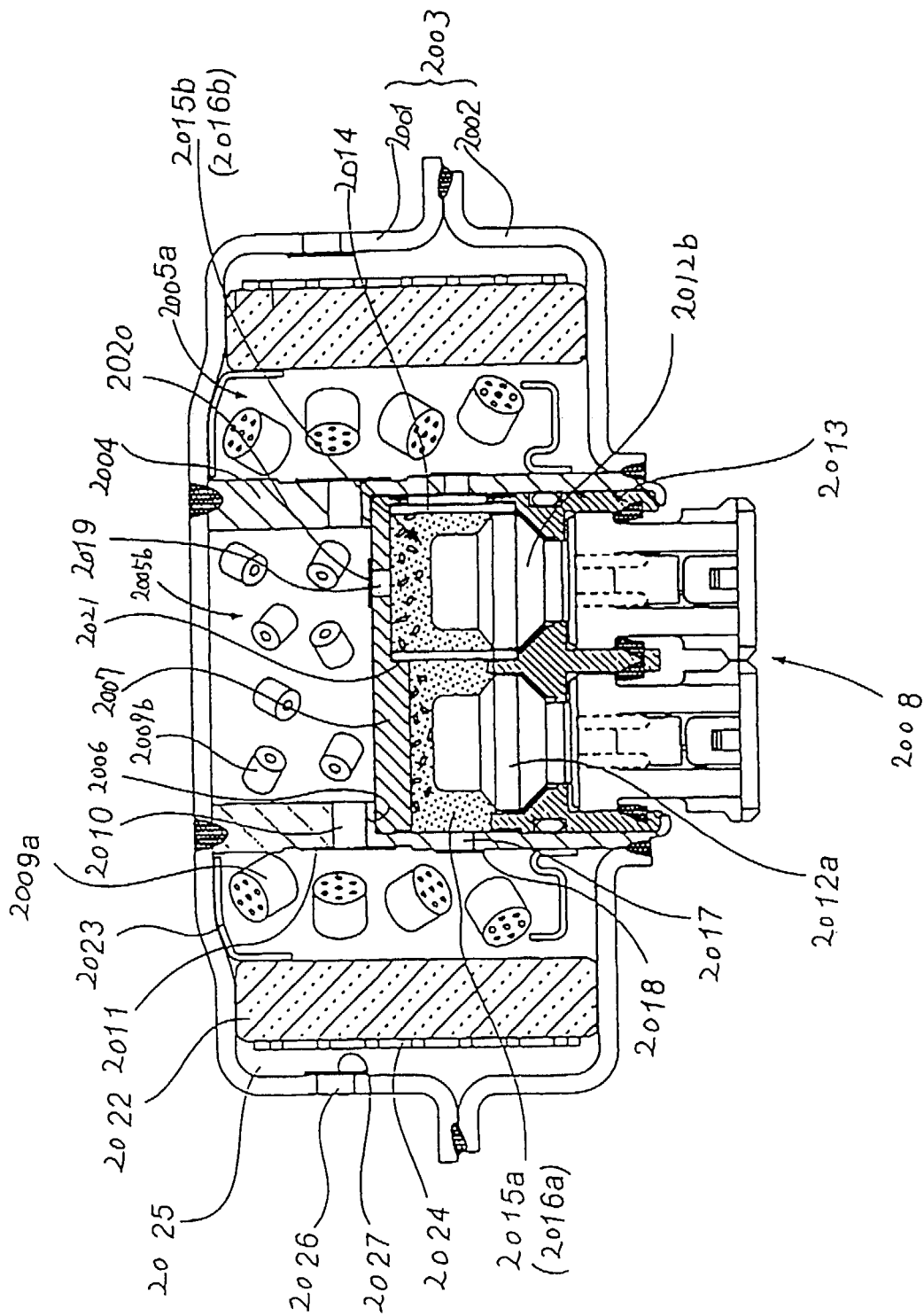
FIG. 12 is a vertical cross sectional view showing one embodiment of a gas generator of the present invention.

FIG. 12 is a vertical cross sectional view of one embodiment of a gas generator for an air bag according to the present invention, which shows a structure particularly suitable for being arranged in a driver side.

The gas generator comprises a housing 2003 which is formed by joining a diffuser shell 2001 with a gas discharge port 2026 and a closure shell 2002 forming an inner accommodating space with the diffuser shell, and an inner-cylindrical member 2004 formed in a substantially cylindrical shape disposed in the housing 2003, thereby making a first combustion chamber 2005a outside of the inner-cylindrical member 2004.

Further, a stepped notch portion 2006 is provided inside the inner-cylindrical member 2004, a partition wall 2007 formed in a substantially disk-shape is disposed in the stepped notch portion, the partition wall further partitions the inside of the inner cylinder into two chambers so as to form a second combustion chamber 2005b in the diffuser shell side and an ignition means accommodating chamber 2008 in the closure shell side, respectively.

Therefore, in this gas generator, the first combustion chamber 2005a and the second combustion chamber 2005b are concentrically provided in the housing 2003 and arranged adjacent to each other in the radial direction of the housing. Gas generating agents 2009a and 2009b which are to be burnt by ignition means activated upon the impact so as to generate a combustion gas are stored in the first and second combustion chambers, and the ignition means to be actuated upon the impact is stored in the ignition means accommodating chamber 2008.

A through hole 2010 is provided in the inner-cylindrical member 2004 which defines the first combustion chamber 2005a and the second combustion chamber 2005b, and the through hole is closed by a seal tape 2011. And, since the seal tape 2011 is ruptured when the gas generating agent is burnt, both combustion chambers can be communicated with each other by the through hole 2010. This seal tape 2011 needs to be adjusted on its material and its thickness so that the seal tape is not ruptured when the gas generating agent 2009a in the first combustion chamber 2005a is burnt, but it is ruptured exclusively when the gas generating agent 2009b in the second combustion chamber 2005b is burnt. In the present embodiment, a stainless steel tape having a thickness of 40 µm is used. Also, the through hole 2010 does not function to control the internal pressure in the combustion chamber 2005b since an opening area thereof is formed larger than a gas discharge port 2026b.

In the present embodiment, an ignition means accommodating chamber 2008 is defined by a space between an initiator collar 2013 and a partition wall 2007, a substantially cylindrical separating cylinder 2014 is arranged to surround one igniter 2012b (hereinafter, referred to as "a second igniter 2"), a first transfer charge accommodating chamber 2015a and a second transfer charge accommodating chamber 2015b are defined respectively outside and inside the separating cylinder 2014, and igniters 2012a and 2012b and transfer charges 2016a and 2016b constituting the ignition means with the igniters are stored in the respective accommodating chambers. In this embodiment, there is not any space but for the respective transfer charge accommodating chambers in the ignition means accommodating chamber 2008. Accordingly, the ignition means accommodating chamber 2008 are partitioned to two chambers of the first transfer charge accommodating chamber 2015a and the second transfer charge accommodating chamber 2015b, and the transfer charges 2016a and 2016b constituting the ignition means with the igniters are securely sectioned to correspond to the respective igniters 2012a and 2012b.

When the transfer charge 2016a stored in the first transfer charge accommodating chamber 2015a burns, a seal tape 2018 closing a flame-transferring hole 2017 formed in the inner-cylindrical member 2004 is ruptured so that the first transfer charge accommodating chamber 2015a communicates with the first combustion chamber 2005a to ignite and burn the porous gas generating agent 2009a. When the transfer charge 2016b stored in the second transfer charge accommodating charge 2015b burns, a seal tape 2020 closing a flame-transferring hole 2019 formed in the partition wall 2007 is ruptured so that the second transfer charge accommodating chamber 2015b communicates with the second combustion chamber 2005b to ignite and burn a gas generating agent with a single hole 2009b. The combustion gas generated within the second combustion chamber 2009b flows into the first combustion chamber 2005a through a through hole 2010 provided on the diffuser shell 2001 side of the inner-cylindrical member 2004. Accordingly, when the gas generator is activated, the flame generated when the first igniter 2012a is ignited and actuated ignites and burns the transfer charge 2016a in the accommodating chamber 2015a and the flame thereof passes through a flame-transferring hole 2017 formed in the inner-cylindrical member 2004 to ignite and burn the gas generating agent 2009a with seven holes stored in the first combustion chamber 2005a positioned in the radial direction of the accommodating chamber 2015a.

In the present embodiment, the charge density of the transfer charge in the ignition means accommodating chamber 2008, that is, the charge density of the transfer charge 2016a in the first transfer charge accommodating chamber 2015a and the charge density of the transfer charge 2016b in the second transfer charge accommodating chamber 2015b (each transfer charge weight g/each transfer charge accommodating chamber volume $cm^3$), is set to 0.5 to 1.5 $g/cm^3$.

By setting the charge density of the transfer charge in the above range, the internal pressure of each transfer charge accommodating chamber (=each ignition means accommodating chamber) at a time of burning each transfer charge can be kept properly, and the combustion of the gas generating agents 2009a and 2009b due to rupture of the respective seal tapes 2017 and 2020 are made smooth and stable.

In a gas generator shown in FIG. 12, the second igniter 2012b and the first igniter 2012a can be simultaneously ignited, but the former 2012b cannot be actuated prior to actuation of the latter 2012a. That is, the gas generating agent 2009b stored in the second combustion chamber 2005b is burnt simultaneously with or subsequently to the gas generating agent 2009a stored in the first combustion chamber 2005a. In a case that the gas generating agent 2009a in the first combustion chamber 2005a is burnt prior to the second gag generating agent 2009b, the seal tape 2011 is not ruptured due to the combustion of the first gas generating agent 2009a but it is ruptured due to the combustion of the second gas generating agent 2009b.

Such an action can be achieved by setting the charge density of each transfer charge in the predetermined range, and the thickness or the strength of the seal tape together with the charge density can further be changed properly.

And, in the gas generator shown in FIG. 12, the separating cylinder 2014 disposed between the initiator collar and the partition wall is arranged so that the upper end the lower end of the separating cylinder 2014 are fitted into respective hole portions which are provided on the lower surface of the partition wall 2007 and the upper surface of the initiator collar 2013, having such a shape to correspond to an outer shape of the separating cylinder 2014. By disposing the separating cylinder 2014 in this manner, a flame of the transfer charge generated in either transfer charge combustion chamber does not directly burn the transfer charge in the other transfer charge accommodating chamber, and the gas generating agents stored in two combustion chambers are respectively ignited and burnt by the flame generated by the combustion of the transfer charges in the respective sections. Namely, in general, when the transfer charge burns in the separating cylinder 2014 (that is, in the second transfer charge accommodating chamber), a pressure of the gas generated by the combustion serves so as to expand the separating cylinder in the radial direction, but by arranging the separating cylinder, the upper and lower end portions of the separating cylinder are unfailingly supported to peripheral walls of the hole portions where the respective portions are fitted, so that, in comparison with the case of simply interposing the separating cylinder between the partition wall and the initiator collar, leaking of the combustion gas and the flame of the transfer charge can be prevented securely.

The ignition means comprises two electric ignition type igniters (2012a, 2012b) to be activated by the activating signal outputted when the sensor detects the impact, and the igniters are provided parallel to each other in one initiator collar 2013, exposing head portions thereof. As mentioned above, two igniters are fixed to the initiator collar 2013 so as to form a single member by providing two igniters (2012a, 2012b) in one initiator collar 2013, thereby facilitating an assembly to the gas generator. In particular, in the gas generator illustrated in this drawing, since the initiator collar 2013 is formed in a size capable of being inserted into the inner-cylindrical member 2004, the igniters can be easily and securely fixed by crimping the lower end of the inner-cylindrical member 2004 to fix the initiator collar after inserting the initiator collar 2013 with two igniters (2012a, 2012b) into the inner cylinder 2004. Further, when arranging two igniters (2012a, 2012b) in the initiator collar 2013, a direction of each igniter can be easily controlled.

And, a common coolant/filter 2022 for purifying and cooling the combustion gas generated by the combustion of the gas generating agents (2009a, 2009b) is disposed in the housing 2003, and an inner periphery thereof in the diffuser shell 2001 side is covered with a short-pass preventing member 2023 so that the combustion gas does not pass between an end surface of the coolant/filter 2022 and a ceiling-portion inner surface 2028 of the diffuser shell 1. An outer layer 2024 for suppressing expansion of the filter 2022 due to passing of the combustion gas or the like is arranged on the outside of the coolant/filter 2022. The outer layer 2024 is, for example, made of a layered wire mesh body, and in addition, may be formed by using a porous cylindrical member having a plurality of through holes on a peripheral wall surface or a belt-like suppressing layer obtained by forming a belt-like member with a predetermined width into an annular shape. A gap 2025 is further formed on the outside of the outer layer 2024 so that the combustion gas can pass through all portions of the filter 2022. Gas discharge ports 2026 formed in the diffuser shell are closed by seal tapes 2027 in order to prevent outer air from entering. The seal tape 2027 is ruptured when the gas is discharged. The seal tape 2027 is for protecting the gas generating agent from outer moisture, and it does not affect such a performance adjustment as combustion internal pressure at all.

In the gas generator constituted in the above manner, when the first igniter 2012a disposed outside of the separating cylinder 2014 which is inside the ignition means accommodating chamber 2008 is activated, the transfer charge 2016a stored in the first transfer charge accommodating chamber 2015a is ignited and burnt, and the flame thereof passes through the flame-transferring hole 2017 in the inner-cylindrical member 2004 and burns the porous cylindrical first gas generating agent 2009a with seven holes in the first combustion chamber 2005a. Also, when the second igniter 2012b surrounded by the separating cylinder 2014 is activated simultaneously with or subsequently to the first igniter 2012a, the transfer charge 2016b stored in the second transfer charge accommodating chamber 2015b is ignited and burnt, and the flame ignites and burns the single hole cylindrical second gas generating agent 2009b stored in the second combustion chamber 2005b. As a result, the ignition timings of the two igniters (2012a, 2012b) can be adjusted, namely, the output behavior (operation performance) of the gas generator can be optionally adjusted by activating the second igniter after activation of the first igniter or activating the first igniter and the second igniter simultaneously. And therefore, under various kinds of circumstances such as a speed of a vehicle and an environmental temperature at a time of collision, it is possible to make an inflation of the air bag in the air bag apparatus mentioned below most suitable. Particularly, in the gas generator illustrated in this figure, the respective combustion chambers (2005a, 2005b) adopt the gas generating agents (2009a, 2009b) to provide different shapes from each other, respectively, and the porous cylindrical first gas generating agent 2009a and the single hole cylindrical second gas generating agent 2009b are stored respectively in the first combustion chamber 2005a and the second combustion chamber 2005b. Further, the amount of the gas generating agent stored in each combustion chamber (2005a, 2005b) is different, and the gas generating agents (2009a, 2009b) at an amount of 35 g and 6 g are stored respectively in the first combustion chamber 2005a and the second combustion chamber 2005b. Consequently, in this gas generator, the output behavior can be adjusted more precisely. Naturally, a shape, a composition, a composition ratio, an amount, etc. of the gas generating agent may be changed to obtain the desired output behavior.

Embodiment 7

Figure 13:
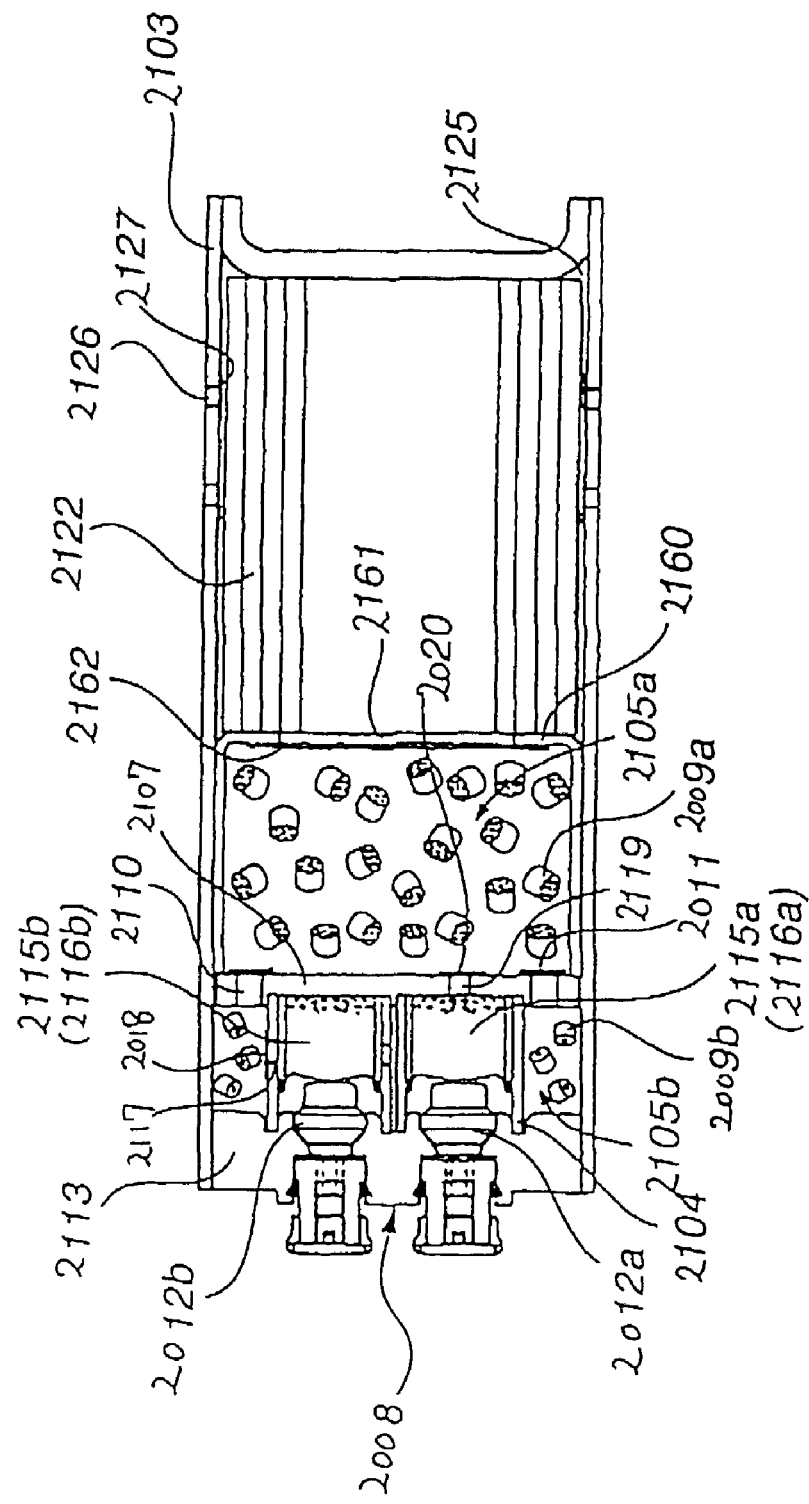
FIG. 13 is a vertical cross sectional view showing other embodiment of a gas generator of the present invention.

FIG. 13 is a vertical cross sectional view showing other embodiment of a gas generator for an air bag according to the present invention. This gas generator is structured such as to be particularly suitable for being arranged on a front passenger side.

A gas generator shown in FIG. 13 has, in the housing 2103 formed into a cylindrical shape having the axial core length longer than the outermost diameter and having a plurality of gas discharge ports on a peripheral wall thereof, and an ignition means to be actuated on the impact, gas generating agents (2009a, 2009b) which are to be ignited and burnt by the ignition means and generate a combustion gas for inflating the air bag and a coolant/filter 2122 for cooling and/or purifying the combustion gas generated by the combustion of the gas generating agents. Then, two combustion chambers (2105a, 2105b) provided as a cylindrical combustion chamber 2105a and an annular combustion chamber 2105b in the housing 2103 are concentrically provided so as to be adjacent to each other to an axial direction of the housing 2103, and a communicating hole 2110 which allows mutual communication between the combustion chambers (2105a, 2105b) is provided.

The gas generator shown in the present embodiment is formed in a long shape in the axial direction since the housing is formed in a long cylindrical shape in the axial direction. In the gas generator formed in this shape, particularly, two combustion chambers (2105a, 2105b), such as the cylindrical combustion chamber 2105a and the annular combustion chamber 2105b, are combined in the above manner, and concentrically arranged to be adjacent to each other and then, allowed to communicate with each other, thereby realizing an easily manufactured gas generator with a simple structure in which the output thereof and the timing for increasing the output can be optionally adjusted.

Then, the ignition means comprises two or more igniters to be activated on the impact and the respective igniters (2012a, 2012b) are provided in one initiator collar 2113 so as to be parallel to each other, thereby an assembly thereof can be easily performed. Also, the respective igniters (2012a, 2012b) assembled to the one initiator collar 2113 and stored in the housing are positioned eccentrically to the axis of the housing.

Further, a coolant/filter 2122 formed in a substantially cylindrical shape is arranged in the housing 2103 to be opposite to a housing inner periphery on which a plurality of gas discharge ports 2126 are formed, and a predetermined gas 2125 is secured between the filter 2122 and the housing inner periphery. The first combustion chamber 2105a is defined so as to be adjacent to a space in which the coolant/filter 2122 is installed, and the ignition means including two igniters (2012a, 2012b) is concentrically arranged to be adjacent to the first combustion chamber 2105a. Then, since the annular second combustion chamber 2105b is defined in the radial direction of the ignition means, the first combustion chamber 2105a and the second combustion chamber 105b are provided so as to be adjacent to each other in the axial direction of the housing 2103. The different gas generating agents (2009a, 2009b) are respectively charged in the first and second combustion chambers, and in the gas generator shown in this drawing, the porous cylindrical first gas generating agent 2009a and the single hole cylindrical second gas generating agent 2009b are respectively stored in the first combustion chamber 2105a and the second combustion chamber 2105b.

The above ignition means comprises, in the ignition means accommodating chamber 2008, igniters (2012a, 2012b) and the transfer charges which are to be ignited and burnt according to the activation of the igniters (2012a, 2012b) to ignite the gas generating agents (2105a, 2105b) by the flame thereof, and the transfer charges are partitioned for respective igniters and independently ignited and burnt at the respective igniters. A space where the transfer charge partitioned for each igniter is stored is defined by a cylindrical member, a first transfer charge accommodating chamber 2115a where a first transfer charge 2116a is stored communicates with the first combustion chamber 2105a by a flame-transferring hole 2119 on a partition wall 2107 arranged between the ignition means and the first combustion chamber 2105a, and a second transfer charge accommodating chamber 2115b where a second transfer charge 2116b is stored communicates with the second combustion chamber 2105b by a flame-transferring hole 2117 formed on the cylindrical member 2104 which defines the accommodating chamber 2115b. The flame-transferring hole 2119 and the flame-transferring hole 2117 are respectively closed by a seal tape 2020 and a seal tape 2018. Since the seal tape 2011 closing a through hole 2110 formed in the partition wall 2107 is ruptured due to combustion of the second gas generating agent 2009b, the first combustion chamber 2105a and the second combustion chamber 2105b communicate with each other by the through hole 2110.

In the present embodiment, the charge density of the transfer charge in the ignition means accommodating chamber 2008, that is, the charge density of the transfer charge 2116a in the first transfer charge accommodating chamber 2115a and the charge density of the transfer charge 2116b in the second transfer charge accommodating chamber 2115b (each transfer charge weight g/each transfer charge accommodating chamber volume $cm^3$), is set to 0.5 to 1.5 $g/cm^3$.

By setting the charge density of the transfer charge, the internal pressure of each transfer charge accommodating chamber (=each ignition means accommodating chamber) at a time of burning each transfer charge can be maintained properly, and the combustion of the gas generating agents 2009a and 2009b due to rupture of the respective seal tapes 2018 and 2020 are made smooth and stable.

In the gas generator shown in FIG. 13, when the first igniter 2012a is activated, the transfer charge 2116a in the first transfer charge accommodating chamber 2115a is ignited and burnt, and the flame thereof passes through the flame-transferring hole 2119 of the partition wall member 2107 to ignite and burn the gas generating agent 2009a in the first combustion chamber 2105a for generating a gas. This gas is purified and cooled while passing through the coolant/filter 2122, and it is discharged from the gas discharge port 2126.

On the other hand, when the second igniter 2012b is activated, the transfer charge 2116b in the second transfer charge accommodating chamber 2115b is ignited and burnt, and the flame thereof ignites and burns the gas generating agent 2009b in the second combustion chamber 2105b. The combustion gas generated in the second combustion chamber 2105b passes through the interior of the first combustion chamber 2105b via the through hole 2110 of the partition wall 2107, and it is purified and cooled while passing through the coolant/filter 2122 and discharged from the gas discharge port 2126. The combustion gas generated due to combustion of the first gas generating agent and the combustion gas generated due to combustion of the second gas generating agent are purified and cooled while passing through the same coolant/filter 2122.

Incidentally, in the present embodiment, the gas discharge port 2126 is also closed by a seal tape 2127. The seal tape 2127 is for protecting the gas generating agent from external moisture, and it is ruptured by the combustion gas generated due to combustion of the gas generating agent so that the combustion gas can be discharged. Accordingly, this seal tape 2127 does not function to control the combustion performance (combustion internal pressure) of the gas generating agent.

Also, a communicating hole 2161 communicating both chambers is provided in a sectioning member 2160 which partitions the first combustion chamber 2105b and the space where the coolant/filter 2122 is installed, the combustion gas generated in the first and second combustion chambers (2105a, 2105b) reaches the space installing the coolant/filter 2122 through the communicating hole 2161. According to this embodiment, a communicating hole 2161 having substantially the same size as an inner diameter of the coolant/filter 2122 is formed in the sectioning member 2160. Then, a wire mesh 2162 is placed in the communication hole 2161 so that the gas generating agent 2009a in the first combustion chamber 2105a does not move to a side of the space where the coolant/filter 2122 is installed, at a time of the combustion. Any kinds of wire mesh can be used for this wire mesh 2162 as long as it does not have a mesh size which can prevent the first gas generating agent 2009a from moving during the combustion and does not have a draft resistance such as to control the combustion performance.

As mentioned above, also in the gas generator according to this embodiment, the gas generating agents (2009a, 2009b) stored in the respective combustion chambers (2105a, 2105b) are independently ignited and burnt by adjusting the activation timing of two igniters (2012a, 2012b), so that the output behavior (the operation performance) of the gas generator can be optionally adjusted. Consequently, in various circumstances such as the speed of the vehicle at a time of collision, an environmental temperature, it is possible to make it most suitable to inflate the air bag in the case of using an air bag apparatus mentioned above.

Incidentally, in relation to the embodiment shown in FIG. 13, two combustion chambers provided in the housing may be provided to be adjacent to each other in the axial direction and the radial direction of the housing.

Embodiment 8

Figure 14:
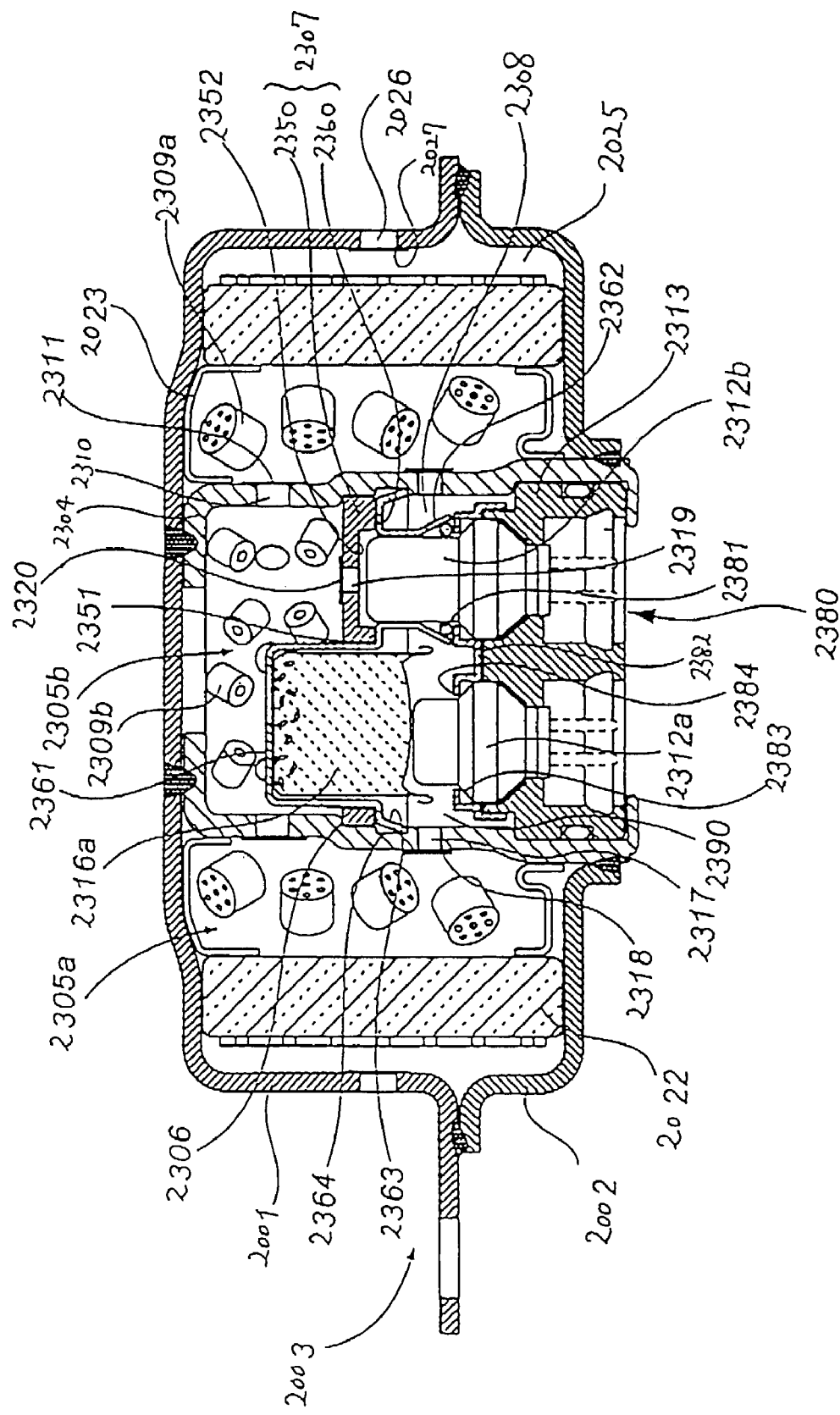
FIG. 14 is a vertical cross sectional view showing still other embodiment of a gas generator of the present invention.

FIG. 14 is a vertical cross sectional view showing still other embodiment of a gas generator for an air bag of the present invention. The gas generator shown in this drawing is structured so as to be particularly suitable for being arranged in a driver side, like the gas generator shown in FIG. 12.

Also in the gas generator shown in FIG. 14, a first combustion chamber 2305a and a second combustion chamber 2305b are defined by an inner-cylindrical member 2304, and they are arranged to be concentrically adjacent to each other inside a housing 3. A stepped notch portion 2306 is provided at the predetermined height on an inner periphery of this inner-cylindrical member 2304, and a partition wall 2307 defining the second combustion chamber 2305b and the ignition means accommodating chamber 2308 is arranged at the stepped notch portion 2306.

Figure 15:
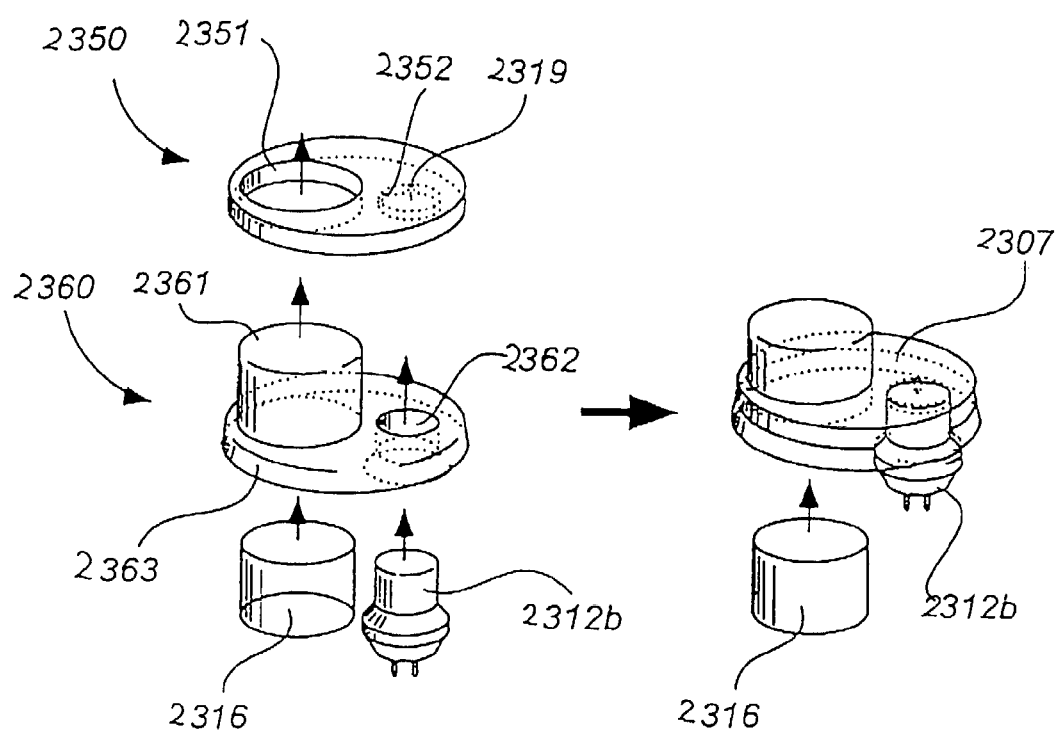
FIG. 15 is a partially enlarged view of the gas generator shown in FIG. 14.

In the present embodiment, this partition wall 2307, as shown in an exploded perspective view of FIG. 15, comprises a sectioning circular member 2350 engaged with the stepped notch portion 2306 of the inner-cylindrical member 2304 and a seal cup member 2360 engaged with the sectioning circular member 2350. The sectioning circular member 2350 is formed in a substantially disk-shape, and has an opening portion 2351 into which a transfer charge accommodating portion 2361 of a seal cup member 2360 is fitted, a circular hollow portion 2352 obtained by hollowing a bottom surface in a circular shape to receive the upper portion of an igniter 2312b, and a second flame-transferring hole 2319 piercing through a substantially center of the circular hole portion. The seal cup member 2360 has a cylindrical transfer charge accommodating chamber 2361 which fits into the opening portion 2351 of the sectioning circular member 2350 and protrudes into the second combustion chamber 2305b, and a cylindrical igniter receiving port 2362 formed at a position facing the circular hollow portion 2352 of the sectioning circular member 2350 and extending towards the opposite direction of the transfer charge accommodating portion 2361. A first transfer charge 2316a is stored inside the transfer charge accommodating portion 2361, and a second igniter 2312b is inwardly fitted to the igniter receiving port 2362. The sectioning circular member 2350 and the seal cup member 2360 are engaged with each other by fitting the transfer charge accommodating portion 2361 of the seal cup member 2360 into the opening portion 2351 of the sectioning circular member 2350, and the upper portion of the second igniter 2312b inwardly fitted to the igniter receiving port 2362 exposes into the circular hollow portion 2352 of the sectioning circular member 2350.

The partition wall 2307 constituted by the sectioning circular member 2350 and the seal cup member 2360 is, as shown in FIG. 14, engaged with the stepped notch portion 2306 formed on the inner periphery of the inner-cylindrical member 2304. That is, the peripheral edge of the sectioning circular member 2350 is supported by the stepped notch portion 2306, and the seal cup member 2360 is supported in contact with the sectioning circular member 2350. Further, the peripheral edge of the seal cup member 2360 is formed by being bent in the same direction as that of the igniter receiving port 2362, and a bent portion 2363 is fitted into a groove 2364 provided on the inner periphery of the inner-cylindrical member 2304. Accordingly, the sectioning circular member 2350 is supported by the seal cup 2360 and prevented from moving in the axial direction of the housing 2003. Further, the partition wall 2307 (i.e. the seal cup member 2360) and the inner-cylindrical member 2304 are engaged with each other with no gap by fitting the bent portion 2363 in the peripheral edge of the seal cup member 2360 into the groove 2364 on the inner periphery of the inner-cylindrical member 2304. Accordingly, in the inner-cylindrical member 2304, the ignition means accommodating chamber 2308 provided in the closure shell 2002 side and the second combustion chamber 2305b provided in the diffuser shell 2001 side are securely partitioned by an ignition means sealing structure in a combination of the seal cup member 2360 and the groove 2364.

The igniter receiving port 2362 formed in the seal cup member 2360 is structured such that a skirt portion thereof spreads like a fan, and an O-ring 2381 is arranged in the inside thereof, that is, between this and the second igniter 2312b stored in the receiving port 2362, and sealing between the receiving port 2362 and the second igniter 2312b is obtained. And since the O-ring 2381 is also press-contacted to an igniter fixing member 2382 described below, the second igniter 2312b is arranged in a space defined by the circular hollow portion 2352 of the sectioning circular member, the igniter receiving port 2362 of the seal cup member, the O-ring 2381 and the igniter fixing member 2382. The seal tape 2320 closing the second flame-transferring hole 2319 formed in the circular hollow portion 2352 of the sectioning circular member 2350 is ruptured by activating of the second igniter 2312b so that the space sectioned in this manner is caused to communicate with the second combustion chamber 2305b. Then, the first igniter 2312a and the second igniter 2312b are securely separated from each other by a seal structure (hereinafter, referred to as "igniter seal structure") comprising a skirt portion of the igniter receiving port 2362, the O-ring 2381 and the igniter fixing member 2382. Accordingly, a flame generated by actuation of either igniter is prevented from directly flowing into the space where other igniter is stored.

And, in a space (a space which is separated by the igniter seal structure) where the first igniter 2312a is arranged inside the ignition means accommodating chamber 2380, a first transfer charge 2316a is stored in the transfer charge accommodating chamber 2361, and there is the remaining space in the above-mentioned space.

In the present embodiment, the charge density of the first transfer charge 2316a inside the transfer charge accommodating chamber 2361 is set to 0.5 to 1.5 g/cm$^3$. Further, the ratio [(A+B)/A] of the volume of a space where the first transfer charge 2316a occupies (=the volume of the transfer charge accommodating chamber 2361) (A) and the volume of the remaining space 2390 (B) is set to 1.5 to 3.

By setting the charge density of the transfer charge and the ratio [(A+B)/A] to the predetermined ranges, the internal pressure in the ignition means accommodating chamber 2008 at a time of burning of the first transfer charge 2316a can be kept proper, and the combustion of the gas generating agent 2309a due to rupturing of the seal tape 2318 is made smooth and stable.

In actuation of the gas generator shown in this embodiment, a flame generated by the actuation of the first igniter 2312a ignites and burns the first transfer charge 2316a disposed above the first igniter. The flame generated by combustion of the first transfer charge 2316a does not enter in the space where the second igniter 2312b is stored because of the above igniter seal structure, and it does not enter in the second combustion chamber 2305b because of the ignition means seal structure comprising the bent portion 2363 of the seal cup member 2360 and the groove 2364 of the inner-cylindrical member 2304. Accordingly, the flame generated due to combustion of this first transfer charge 2316a flows in the first combustion chamber 2305a through the first flame-transferring hole 2317 formed in the peripheral wall of the inner-cylindrical member 2304 exclusively to ignite and burn the first gas generating agent 2309a and generate a combustion gas.

Also, the flame generated due to actuation of the second igniter 2312b flows in the second combustion chamber 2305b through the second flame-transferring hole 2319 formed in the circular hollow portion 2352 of the sectioning circular member 2350 exclusively to ignite and burn the second gas generating agent 2309b and generate a combustion gas. Particularly, in the gas generator in this embodiment, such a structure is employed that the second transfer charge is not arranged and the second gas generating agent 2309b is ignited and burnt directly by the flame generated due to actuation of the second igniter 2312b.

And, the combustion gas generated due to the combustion of these first gas generating agent 2309a and second gas generating agent 2309b is purified and cooled while passing through the common coolant/filter 2022, and then, it pass through the gap 2025 to be discharged from the gas discharge port 2026. The seal tapes 2318 and 2320 closing the first and second flame-transferring holes are ruptured when the flames of the igniters and the combustion gas of the transfer charges passes through the holes, and the seal tape 2027 closing the gas discharge port 2026 is ruptured when the combustion gas passes.

Also, in this embodiment, in order to make it easy to arrange the igniters in the housing, two igniters 2312a and 2312b are fixed to a single initiator collar 2313. Particularly, in this embodiment, the two igniters 2312a and 2312b are supported by the igniter fixing member 2382 engaged with the initiator collar 2313 and fixed to the initiator collar 2313. This igniter fixing member 2382 is formed in such a shape as to cover the upper surface of the initiator collar 2313 and it has a hole portion 2384 to which the upper portion of each igniter is inserted to support a shoulder portion 2383. Two igniters 2312a and 2312b arranged in the initiator collar 2313 are fixed to the igniter fixing member 2382 outwardly fitted to the initiator collar 2313. By using such the igniter fixing member 2382, two igniters 2312a and 2312b can easily be combined to the initiator collar 2313. Incidentally, in the gas generator shown in this embodiment, the first igniter 2312a and the second igniter 2312b are formed to have different sizes and different actuation outputs from each other, but igniters with the same actuation outputs can be used.

In the gas generator shown in this embodiment, also, the first gas generating agent 2309a and the second gas generating agent 2309b are respectively ignited and burnt by actuation of the first igniter 2312a and actuation of the second igniter 2312b independently from each other. However, there is a case that current flows through only first igniter 2312a so that only the gas generating agent 2309a inside the first combustion chamber 2305a is ignited and burnt. In other words, there is a case that the second gas generating agent 2309b and the second igniter 2312b are left without being burnt. In such a case, since a drawback occurs at a time of post-treatment/waste or the like, it is preferable that, after the gas generator (only the first igniter 2312a) is actuated, the gas generating agent 2309b in the second combustion chamber 2305b is burnt at a further delayed timing (for example, at 100 milliseconds or more) than the normal delayed timing when the second igniter 2312b is actuated (for example, at 10 to 40 milliseconds or the like).

Thereby, an automatic igniting material which is to be ignited and burnt due to heat conduction of the combustion heat of the first gas generating agent 2309a can be arranged inside the second combustion chamber 2305b. In this case, the ignition of the second gas generating agent 2309b by the automatic igniting material is performed at a further delayed timing than the predetermined delayed timing (namely, the actuating interval between the igniters) when normally activating the second igniter 2312b the actuation of the first igniter 2312a. Namely, it is different from the case of delaying the combustion of the second gas generating agent 2309b (i.e. delaying the activation of the second igniter 2312b) in order to adjust the activation performance of the gas generator. The second gas generating agent 2309b is not ignited and burnt by the automatic igniting material during optionally delaying in applying the activating current to the second igniter 2312b in order to adjust the activation performance of the gas generator, either. Incidentally, this automatic igniting material can be arranged in combination with the second igniter.

The first combustion chamber 2305a and the second combustion chamber 2305b are defined by an inner-cylindrical member 2304. A through hole 2310 is formed in the inner-cylindrical member 2304, and the through hole 2310 is closed by a stainless steel plate 2311. This stainless steel plate 2311 is adhered to the inner-cylindrical member 2304 with an adhering member such as an adhesive, and the through hole 2310 is opened exclusively due to the combustion of the second gas generating agent 2309b but it is never opened due to the combustion of the first gas generating agent 2309a. Closing the through hole 2310 by the stainless steel plate 2311 in this manner is for preventing the flame generated due to the combustion of the first gas generating agent 2309a from flowing into the second combustion chamber 2305b via the through hole 2310 to burn the second gas generating agent 2309b.

Accordingly, in addition that the through hole 2310 is closed by the stainless steel plate 2311, such a function can be realized by welding, adhering and heat-sealing a rupturable plate, which is to be ruptured, peeled off, burnt out or released by the pressure due to the combustion of the second gas generating agent, to the inner cylindrical member in order to close the through hole, or by providing a notch at a peripheral wall of the inner-cylindrical member 2304, or by making the thickness of the peripheral wall of the inner-cylindrical member to be partially thin.

Further, a substantially ring-shaped shielding plate can be arranged in the first combustion chamber 2305a side to cover the through hole 2310 provided in the inner-cylindrical member 2304. In a case that the substantially ring-shaped shielding plate is arranged in this manner, even when the combustion gas is generated by the combustion of the first gas generating agent 2309a, the seal tape closing the through hole 2310 is not ruptured by the combustion of the first gas generating agent 2309a, being protected by the shielding plate.

Also in this embodiment, since the through hole 2310 of the inner-cylindrical member 2304 is opened exclusively due to the combustion of the second gas generating agent 2309b but it is never opened due to the combustion of the first gas generating agent 2309a, even when the combustion gas is first generated inside the first combustion chamber 2305a, this gas never flows into the second combustion chamber 2305b, and the gas generating agent 2309b in the second combustion chamber 2305b is ignited and burnt due to activation of the second igniter 2312b (due to the combustion of the automatic igniting material in some case). The combustion gas generated due to the combustion of the second gas generating agent 2312b passes through the through hole 2310 opened due to the combustion to flow through the first combustion chamber 2305a, and then it is purified and cooled by the coolant/filter 2022 to be discharged from the gas discharge port 2026.

Embodiment 9

Figure 16:
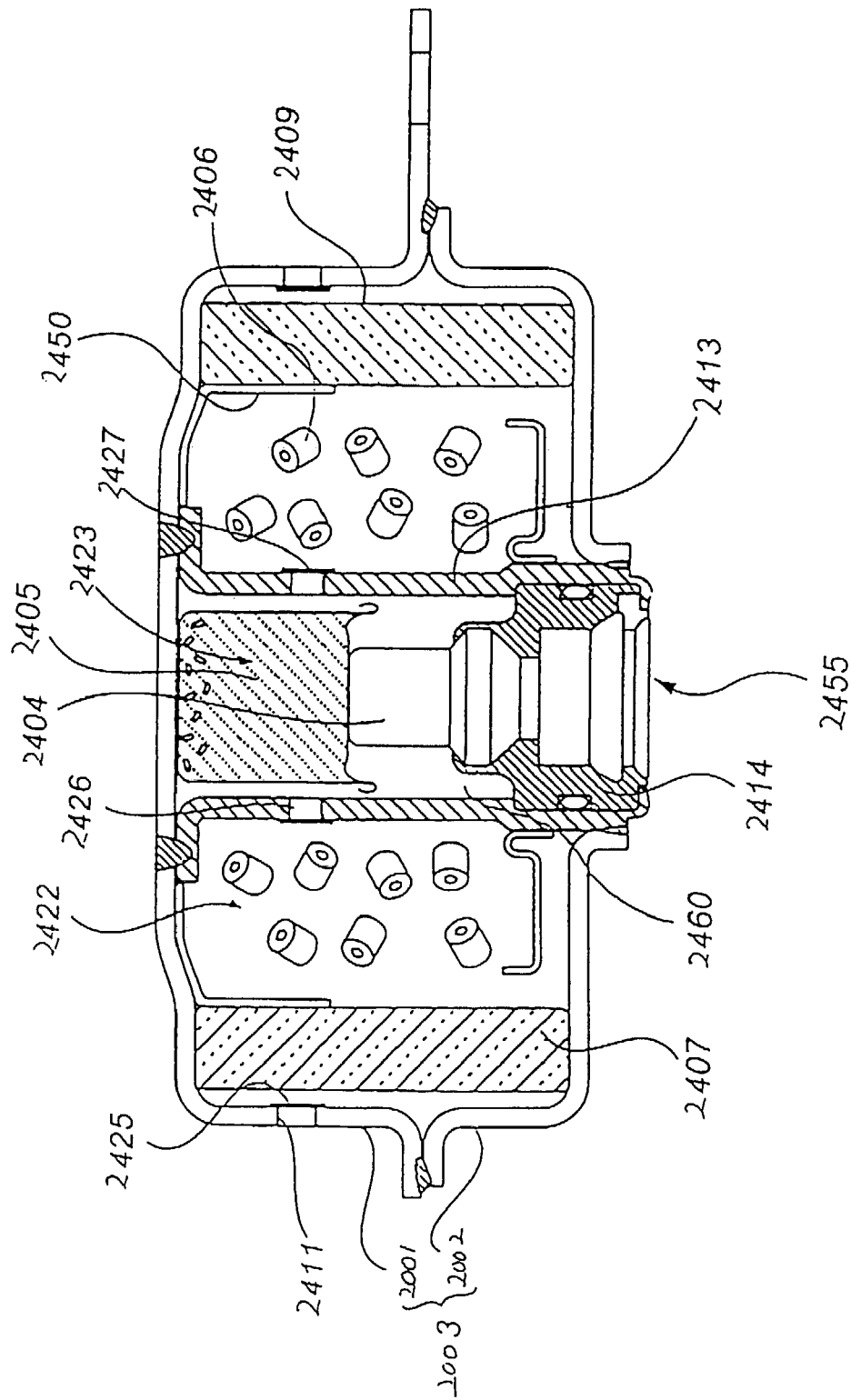
FIG. 16 is a vertical cross sectional view showing still other embodiment of a gas generator of the present invention.

FIG. 16 is a vertical cross sectional view showing one embodiment of a gas generator for an air bag of the present invention, and the gas generator is structured so as to be particularly suitable for being arranged in a driver side. This embodiment is a gas generator having one combustion chamber.

This gas generator comprising a housing 2003 formed by joining a diffuser shell 2001 having a gas discharge port and a closure shell 2002 forming an inner accommodating space with the diffuser shell, and a substantially cylindrical inner-cylindrical member 2413 arranged inside the housing 2003, and a combustion chamber 2422 is defined in the outside thereof and an ignition means accommodating chamber 2455 is defined in the inside thereof.

Therefore, in this gas generator, the combustion chamber 2422 and the ignition means accommodating chamber 2455 are concentrically arranged inside the housing 2003 so as to be adjacent to each other in the radial direction of the housing. A gas generating agent 2406, which is to be burnt by an ignition means actuated upon the impact to generate combustion gas, is stored in this combustion chamber, and the ignition means to be actuated by the impact is stored in the ignition means accommodating chamber 2455.

An igniter 2404 is arranged inside the ignition means accommodating chamber 2455 via an initiator collar 2414, a transfer charge 2405 is stored in a transfer charge accommodating chamber 2423, and there is the remaining space 2460 inside the ignition means accommodating chamber 2455.

In the present embodiment, the charge density of the first transfer charge 2405 inside the transfer charge accommodating chamber 2423 is set to 0.5 to 1.5 g/cm$^3$. Further, the ratio [(A+B)/A] of the volume of a space where the transfer charge 2405 occupies (=the volume of the transfer charge accommodating chamber 2423) (A) and the volume of the remaining space 2460 (B) is set to 1.5 to 3.

By setting the charge density of the transfer charge and the ratio [(A+B)/A] to the predetermined ranges, the internal pressure in the ignition means accommodating chamber 2455 at a time of burning of the first transfer charge 2405 can be maintained proper, and the combustion of the gas generating agent 2406 due to rupture of the seal tape 2427 is made smooth and stable.

In FIG. 16, reference numeral 2407 denotes a coolant/filter, 2409 denotes a gap, 2411 denotes a gas discharge port, 2425 denotes a seal tape, 2426 denotes a communication hole, and 2450 denotes a short pass preventing member.

Embodiment 10

Figure 17:
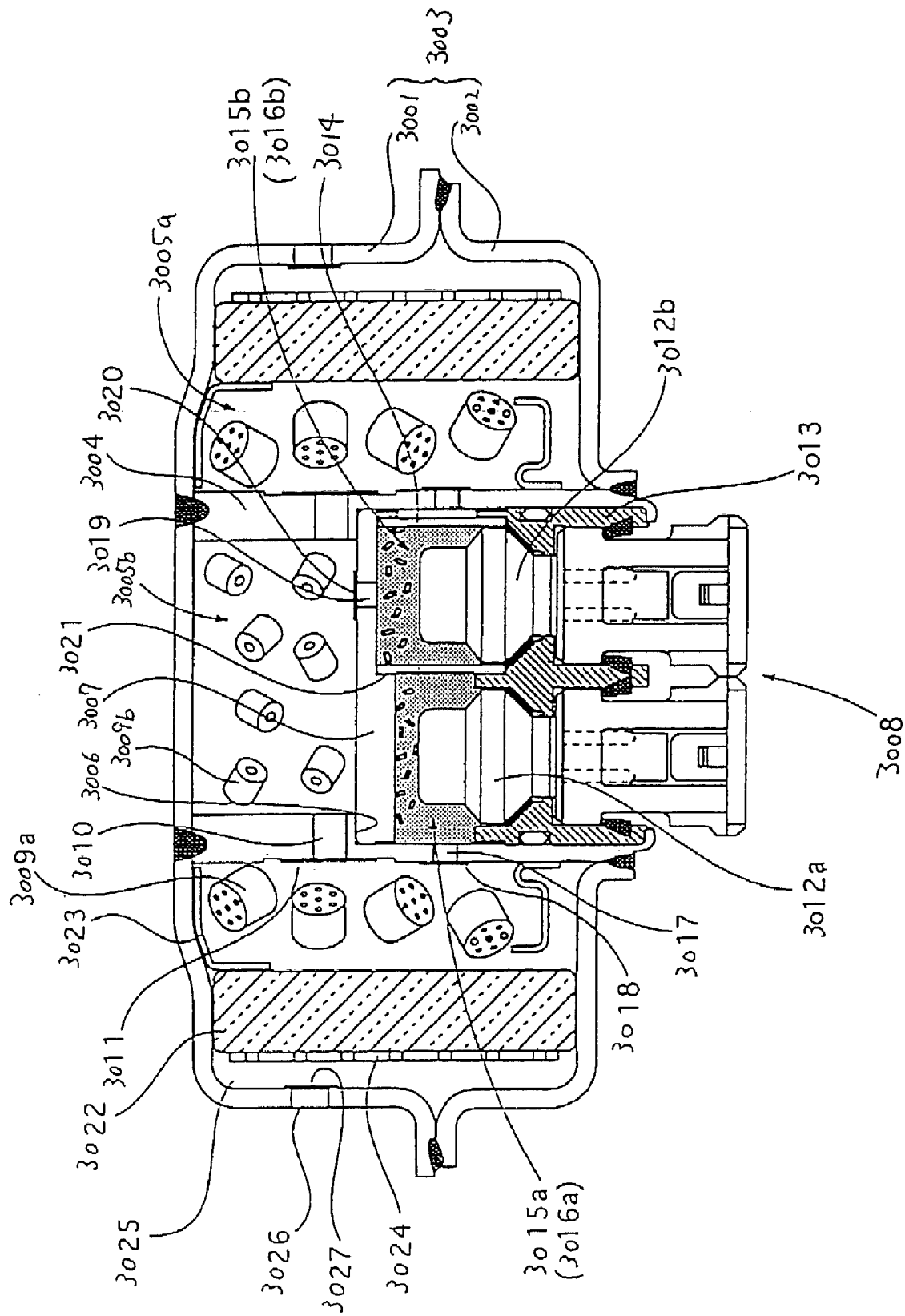
FIG. 17 is a vertical cross sectional view showing Embodiment 12.

FIG. 17 is a vertical cross sectional view of a gas generator for an air bag of the present invention, and the gas generator is structured so as to be particularly suitable for being arranged in a driver side.

This gas generator comprising a housing 3003 formed by joining a diffuser shell 3001 having a gas discharge port and a closure shell 3002 forming an inner accommodating space with the diffuser shell 3001, and a substantially cylindrical inner-cylindrical member 3004 arranged inside the housing 3003, and a first combustion chamber 3005a is defined outside the inner-cylindrical member 3004.

Further, a stepped notch portion 3006 is provided inside the inner-cylindrical member 3004, a substantially disk-shaped partition wall 3007 is arranged in the stepped notch portion 3006, the space inside the inner-cylindrical member 3004 is partitioned into two chambers by this partition wall 3007, so that a second combustion chamber 3005b is formed in the diffuser shell 3001 side (in the upper portion space side) and an ignition means accommodating chamber 3008 is formed in the closure shell 3002 side (in the lower portion space side).

Therefore, in this gas generator, the first combustion chamber 3005a and the second combustion chamber 3005b are concentrically arranged inside the housing 3003 so as to be adjacent to each other in the radial direction of the housing 3003. Gas generating agents 3009a and 3009b which are to be burnt by the ignition means actuated upon the impact to generate a combustion gas are stored in the first and second combustion chambers 3005a and 3005b, respectively, and the ignition means to be actuated by the impact is stored in the ignition means accommodating chamber 3008.

The inner-cylindrical member 3004 defining the first combustion chamber 3005a and the second combustion chamber 3005b is provided with a communication hole 3010, and the communication hole 3010 is closed by a double-layered seal tape 3011. In this double-layered seal tape, each layer is a stainless steel (SUS 304) tape (a tensile strength of a sheet of stainless steel tape is 54 kg/mm$^2$) having a thickness of 40 µm and each of the first adhesive layer and the second adhesive layer is 30 µm.

The ignition means includes two electric ignition type igniters 3012a and 3012b to be activated by the activating signal outputted from a sensor detecting the impact, and the igniters are provided in one initiator collar 3013 in parallel to each other such that head portions thereof exposed. Thus, by providing the igniters 3012a, 3012b in the one initiator 3013, two igniters are fixed to the initiator collar 3013 to be a single member, thereby facilitating the assembly to the gas generator. Particularly, in the gas generator shown in this drawing, by forming the initiator collar 3013 in a size capable to being inserted into the inner-cylindrical member 3004, the initiator collar 3013 provided with the two igniters 3012a, 3012b is inserted into the inner-cylindrical member 3004, and then, the initiator collar 3013 is fixed by crimping a lower end of the inner-cylindrical member 3004, thereby fixing the two initiators easily and securely.

In this embodiment, a substantially cylindrical separating cylinder 3014 is arranged to surround one igniter 3012b (hereinafter, referred to as "second igniter") in a space between the initiator collar 3013 and the partition wall 3007, a first transfer charge accommodating chamber 3015a and a second transfer charge accommodating chamber 3015b are defined outside the separator cylinder and inside the cylinder, respectively, and an igniter and a transfer charge constituting an ignition means with the igniter are stored in each accommodating chamber. As a result, transfer charges 3016a and 3016b constituting the ignition means with the igniter are securely distributed to the respective igniters 3012a and 3012b.

When the transfer charge 3016a stored in the first transfer charge accommodating chamber 3015a burns, a seal tape 3018 closing a flame-transferring hole 3017 formed in the inner-cylindrical member 3004 is ruptured so that the first transfer charge accommodating chamber 3015a communicates with the first combustion chamber 3005a. Also, when the transfer charge 3016b stored in the second transfer charge accommodating charge 3015b burns, the seal tape 3020 closing a flame-transferring hole 3019 formed in a partition wall 3007 is ruptured so that the second transfer charge accommodating chamber 3015b communicates with the second combustion chamber 3005b. Accordingly, when the gas generator is activated, the flame generated when the first igniter 3012a is ignited and actuated ignites and burns the transfer charge 3016a in the accommodating chamber 3015a, and the flame thereof passes through a flame-transferring hole 3017 formed in the inner-cylindrical member 3004 to ignite and burn the gas generating agent 3009a with seven holes stored in the first combustion chamber 3005a positioned in the radial direction of the accommodating chamber 3015a.

Also, the second igniter 3012b ignites and burns the second transfer charge 3016b in the accommodating chamber 3015b, and the flame thereof passes through a flame-transferring hole 3019 provided in an axial direction of the accommodating chamber 3015b to ignite and burn a single hole gas generating agent 3009b stored inside the second combustion chamber 3005 positioned in the extending direction of the flame-transferring hole 3019. The combustion gas generated inside the second combustion chamber 3009b passes through a communication hole 3010 provided in the inner-cylindrical member 3004 in the diffuser shell 3001 side to flow into the first combustion chamber 3005a.

In a gas generator shown in FIG. 17, in some cases, a second igniter 3012b and a first igniter 3012a are simultaneously ignited, but the former 3012b is never actuated prior to actuation of the latter 3012a. In other words, the gas generating agent 3009b stored in the second combustion chamber 3005b is burnt simultaneously with or subsequently to the gas generating agent 3009a stored in the first combustion chamber 3005a.

And, in the gas generator shown in FIG. 17, a separating cylinder 3014 arranged between the initiator collar and the partition wall is arranged so that a hole portion 3021 corresponding to the outer shape of the separating cylinder 3014 are provided on the lower surface of the partition wall 2007 and the upper surface of the initiator collar 3013, and the upper and lower ends of the separating cylinder 3014 are fitted into the respective hole portions. By arranging the separating cylinder 3014 in this manner, a flame of the transfer charge generated in one of the transfer charge combustion chambers does not directly burn the transfer charge in the other transfer charge accommodating chamber, and the gas generating agents stored in two combustion chambers are respectively ignited and burnt by the flame generated by the combustion of the transfer charges in the respective sections. Namely, in general, when the transfer charge burns in the separating cylinder 3014 (that is, in the second transfer charge accommodating chamber), a pressure of the gas generated by the combustion serves so as to expand the separating cylinder 3014 in the radial direction, however, by arranging the upper and lower end portions of the separating cylinder 3014 are securely supported by the peripheral walls of the hole portions where the respective portions are fitted, thereby blocking a leak of the combustion gas or the flame of the transfer charge more unfailingly than the case of simply interposing the separating cylinder between the partition wall and the initiator collar.

Further, a common coolant/filter 3022 for purifying and cooling the combustion gases generated by the combustion of the gas generating agents 3009a and 3009b is disposed in the housing 3003, and an inner periphery in the diffuser shell 3001 side thereof is covered with a short pass preventing member 3023 so that the combustion gas does not pass between an end surface of the coolant/filter 3022 and a ceiling portion inner surface of the diffuser shell 3001. An outer layer 3024 for preventing the filter 3022 from expanding outwardly due to passing of the combustion gas or the like is arranged outside the coolant/filter 3022. The outer layer 3024 is, for example, made of a layered wire mesh body, and in addition, may be made of a porous cylindrical member having a plurality of through holes on a peripheral wall surface or a belt-like suppressing layer obtained by forming a belt-like member with the predetermined width into an annular shape.

A gap 3025 is further formed outside the outer layer 3024 so that the combustion gas can pass through all portions of the filter 3022. A gas discharge port 3026 formed in the diffuser shell is closed by a seal tape 3027 in order to prevent the external air from entering. The seal tape 3027 is ruptured when the gas is discharged. The seal tape 3027 is for protecting the gas generating agent from outer moisture, and it does never affect such a performance adjustment a as combustion internal pressure.

In the gas generator of this embodiment, when the first igniter 3012a disposed outside the separating cylinder 3014 which is inside the ignition means accommodating chamber 3008 is activated, the transfer charge 3016a stored in the first transfer charge accommodating chamber 3015b is ignited and burnt, and the flame thereof passes through the flame-transferring hole 3017 in the inner-cylindrical member 3004 and burns the porous cylindrical first gas generating agent 3009a with seven holes stored in the first combustion chamber 3005a. At this time, the double layered seal tape 3011 closing the communication hole 3010 is neither ruptured nor peeled off because of improvement in the strength obtained by the total thickness of the seal tape and alleviation of the reactive force of the seal tape itself mainly generated by existence of the second adhesive layer, and therefore, the internal pressure in the first combustion chamber 3005a can be increased up to the point such that the gas generating agent 3009a can be ignited and burnt smoothly.

And, when the second igniter 3012b surrounded by the separating cylinder 3014 is activated simultaneously with or subsequently to the first igniter 3012a, the transfer charge 3016b stored in the second transfer charge accommodating chamber 3015b is ignited and burnt, and the flame thereof ignites and burns the single hole cylindrical second gas generating agent 3009b stored in the second combustion chamber 3005b. At this time, the seal tape 3011 is easily peeled off due to increase in the internal pressure of the second combustion chamber 3005b, so that the second combustion chamber 3005b and the first combustion chamber 3005a are communicated with each other through the communication hole 3010.

In the gas generator of this embodiment, the ignition timings of the two igniters 3012a and 3012b can be adjusted, namely, the output behavior (operation performance) of the gas generator can be optionally adjusted by activating the second igniter after activation of the first igniter or activating the first igniter and the second igniter simultaneously. And therefore, under various kinds of circumstances such as a speed of a vehicle and an environmental temperature at a time of collision, it is possible to make an inflation of the air bag in the air bag apparatus mentioned below most suitable. Particularly, in the gas generator illustrated in this drawing, the respective combustion chambers 3005a and 3005b adopt the gas generating agents 3009a and 3009b having different shapes from each other, respectively, and the porous cylindrical first gas generating agent 3009a and the single hole cylindrical second gag generating agent 3009b are stored in the first combustion chamber 3005a and the second combustion chamber 3005b, respectively. Naturally, a shape, a composition, a composition ratio, an amount, etc. of the gas generating agent may be changed to obtain the desired output behavior.

In the gas generator for an air bag of the present invention, when the communication hole 3010 is closed by two sheets of stainless steel (SUS304) tapes (the tensile strength per one sheet is 54 kg/mm$^2$) and an adhesive (each of the first and second adhesive layers has a thickness of 30 μm), these tapes is not ruptured or peeled off up to an internal pressure of 30,000 kPa or so. Accordingly, when the gas generating agent 3009a consisting a nitroguanidine of 20 to 60 weight %, a basic copper nitrate of 35 to 75 weight %, and a guar gum of 0.1 to 10 weight % is formed in a shape shown in FIG. 17 and used in the first combustion chamber 3005a, ignition and combustion can be made smooth. The double-layered stainless steel tape is peeled off by the pressure from the second combustion chamber side.

Embodiment 11

Figure 18:
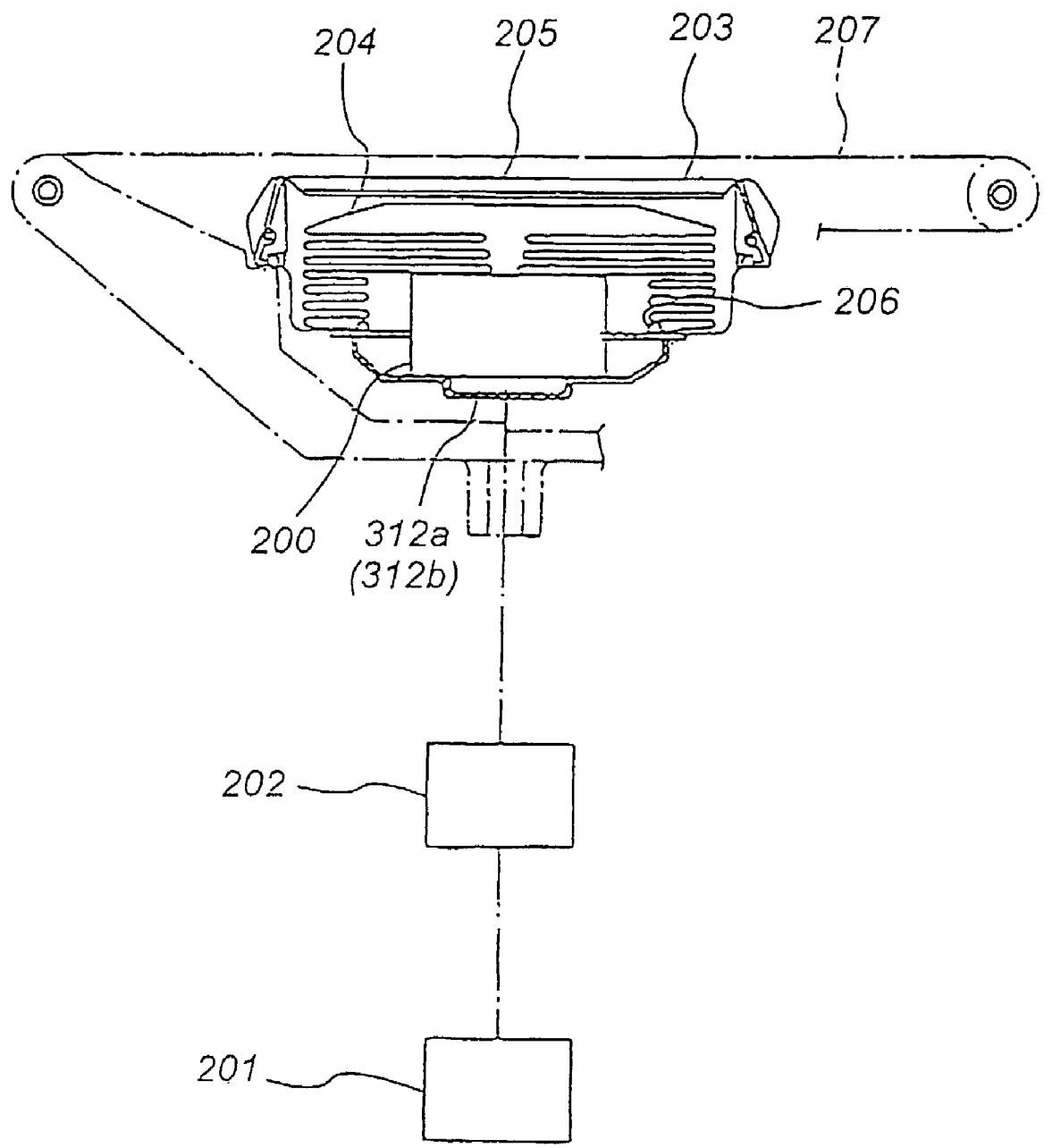
FIG. 18 is a structural view of an air bag apparatus of the present invention.

FIG. 18 shows an embodiment of an air bag apparatus according to the present invention, including a gas generator in which the electric ignition type ignition means is used.

This air bag apparatus comprises a gas generator 200, an impact sensor 201, a control unit 202, a module case 203 and an air bag 204. As the gas generator 200, the gas generator described with reference to FIG. 1 is used and the operation performance thereof is adjusted so as to apply as a small impact as possible to the passenger at the initial stage of the actuation of the gas generator.

The impact sensor 201 can comprise, for example, a semiconductor type acceleration sensor. This semiconductor type acceleration sensor is structured such that four semiconductor strain gauges are formed on a silicone base plate to be bent when the acceleration is applied, and these semiconductor strain gauges are bridge-connected. When the acceleration is applied, the beam defects and a strain is produced on the surface. Due to the strain, a resistance of the semiconductor strain gauge is changed, and the structure is made such that the resistance change can be detected as a voltage signal in proportion to the acceleration.

The control unit 202 is provided with an ignition decision circuit, and the structure is made such that the signal from the semiconductor type acceleration sensor is inputted to the ignition decision circuit. The control unit 202 starts calculation at a time when the impact signal from the sensor 201 exceeds a certain value, and when the calculated result exceeds a certain value, it outputs the activating signal to the igniters 312a and 312b of the gas generator 200.

The module case 203 is formed, for example, by a polyurethane, and includes a module cover 205. The air bag 204 and the gas generator 200 are stored in the module case 203 so as to be constituted as a pad module. This pad module is generally mounted to a steering wheel 207 when being mounted to a driver side of an automobile.

The air bag 204 is formed by a nylon (for example, a nylon 66), a polyester or the like, is structured such that a bag port 206 thereof surrounds the gas discharge port of the gas generator and is fixed to a flange portion of the gas generator in a folded state.

When the semiconductor type acceleration sensor 201 detects the impact at a time of collision of the automobile, the signal is transmitted to the control unit 202, and the control unit 202 starts calculation at a time when the impact signal from the sensor exceeds a certain value. When the calculated result exceeds a certain value, it outputs the activating signal to the igniter 312a, 312b of the gas generator 200. Accordingly, the igniter 12 is activated so as to ignite the gas generating agent, and the gas generating agent burns and generates the gas. The gas is discharged into the air bag 204, whereby the air bag breaks the module cover 205 so as to inflate, thereby forming a cushion absorbing an impact between the steering wheel 207 and the passenger.

The invention claimed is:

1. A gas generator for an air bag comprising a housing having a gas discharge port, ignition means to be actuated by impact, and gas generating means which is to be ignited and burnt by the ignition means for generating a combustion gas to inflate the air bag, wherein gas generating means is stored in a first combustion chamber and gas generating means is stored in a second combustion chamber with a communication hole for allowing communication between the chambers being also provided in the housing, and the communication hole between the first combustion chamber and the second combustion chamber is closed by a plurality of metal thin plates layered through an adhesive, said plurality of metal thin plates being selected so that that they are not broken as a result of combustion in the first combustion chamber but are peeled off or broken as a result of combustion in the second combustion chamber.

2. A gas generator for an air bag according to claim 1, wherein the total thickness of said plurality of metal thin plates layered except for the adhesive is in the range of 10 to 200 μm.

3. A gas generator for an air bag according to claim 1, wherein the thickness of each metal thin plate is in the range of 5 to 100 μm.

4. A gas generator for an air bag according to claim 1, wherein the thickness of a first adhesive layer provided on a contacting surface between a peripheral edge portion of the communication hole and a first metal thin plate is in the range of 10 to 50 μm.

5. A gas generator for an air bag according to claim 1, wherein the thickness of a second adhesive layer provided on a contacting surface between a first metal thin plate and a second metal thin plate is in the range of 10 to 50 μm.

6. A gas generator for an air bag according to claim 1, wherein the communication hole is closed by the metal thin plates from the side of the inner wall of the first combustion chamber.

7. The gas generator for an air bag according to claim 1, wherein the metal thin plates are made of stainless steel.

* * * * *